United States Patent
Hammel et al.

(10) Patent No.: US 7,283,494 B2
(45) Date of Patent: Oct. 16, 2007

(54) NETWORK CHANNEL ACCESS PROTOCOL-INTERFERENCE AND LOAD ADAPTIVE

(75) Inventors: Thomas Hammel, San Francisco, CA (US); Kirk Alton Bradley, Menlo Park, CA (US); Mark J. Rich, Menlo Park, CA (US)

(73) Assignee: Skypilot Networks, Inc., Santa Clara, CA (US)

( * ) Notice: Subject to any disclaimer, the term of this patent is extended or adjusted under 35 U.S.C. 154(b) by 895 days.

(21) Appl. No.: 10/122,659

(22) Filed: Apr. 15, 2002

(65) Prior Publication Data

US 2002/0176396 A1 Nov. 28, 2002

Related U.S. Application Data

(60) Provisional application No. 60/284,678, filed on Apr. 18, 2001.

(51) Int. Cl.
*H04Q 7/20* (2006.01)
*H04Q 7/00* (2006.01)
*H04L 12/28* (2006.01)
*H04J 3/16* (2006.01)

(52) U.S. Cl. .......... 370/329; 370/337; 370/468; 370/395.41; 455/446; 455/452.1; 455/452.2

(58) Field of Classification Search .......... 370/468, 370/335, 330, 328, 329, 337, 347, 341, 432; 455/421, 435.3, 450, 13.1, 437
See application file for complete search history.

(56) References Cited

U.S. PATENT DOCUMENTS

| | | | | |
|---|---|---|---|---|
| 4,870,408 A | * | 9/1989 | Zdunek et al. | 370/341 |
| 5,241,685 A | * | 8/1993 | Bodin et al. | 455/453 |
| 5,530,575 A | | 6/1996 | Acampora et al. | 359/128 |
| 5,590,395 A | * | 12/1996 | Diekelman | 455/13.1 |
| 5,606,551 A | | 2/1997 | Katalopoulos | 370/406 |
| 5,613,198 A | * | 3/1997 | Ahmadi et al. | 370/337 |
| 5,621,727 A | | 4/1997 | Vaudreuil | 370/60 |
| 5,682,382 A | | 10/1997 | Separd | 370/342 |

(Continued)

FOREIGN PATENT DOCUMENTS

EP 0837567 4/1998

(Continued)

OTHER PUBLICATIONS

Shacham et al., "Algorithms for Radio Networks with Dynamic Topology" SRI International Final Report, project No. 6229, pp. 1-28. Jan. 1992.

(Continued)

*Primary Examiner*—Hanh Nguyen
(74) *Attorney, Agent, or Firm*—Moser IP Law Group

(57) ABSTRACT

Network channel access protocol is disclosed. More particularly, a distributed, locally determined, channel access protocol that adapts to load, avoids interference and controls access by a group of nodes to a set of shared channels is disclosed. Shared channel space is divided into a number of communication slots that are repeated at a predetermined interval. Permission to use a slot to communicate between any two nodes is dynamically adjusted by the channel access protocol, which locally: (i) estimates load to neighboring nodes; (ii) allocates or deallocates slot usage to adapt to load and avoid interference; and (iii) asserts and advertises slot usage within an interference area about itself.

25 Claims, 14 Drawing Sheets

U.S. PATENT DOCUMENTS

| | | | |
|---|---|---|---|
| 5,742,593 A | 4/1998 | Sharony et al. | 370/330 |
| 5,764,909 A | 6/1998 | Nishimura | 395/200.53 |
| 5,835,726 A | 11/1998 | Shwed et al. | 395/200.59 |
| 5,842,043 A | 11/1998 | Nishimura | 395/856 |
| 5,949,760 A | 9/1999 | Stevens et al. | 370/254 |
| 6,028,857 A | 2/2000 | Poor | 370/351 |
| 6,049,593 A | 4/2000 | Acampora | 379/56.2 |
| 6,055,236 A | 4/2000 | Nessett et al. | 370/389 |
| 6,072,778 A * | 6/2000 | Labedz et al. | 370/252 |
| 6,098,172 A | 8/2000 | Coss et al. | 713/201 |
| 6,141,749 A | 10/2000 | Coss et al. | 713/162 |
| 6,154,775 A | 11/2000 | Coss et al. | 709/225 |
| 6,157,955 A | 12/2000 | Narad et al. | 709/228 |
| 6,170,012 B1 | 1/2001 | Coss et al. | 709/229 |
| 6,178,455 B1 | 1/2001 | Schutte et al. | 709/228 |
| 6,182,226 B1 | 1/2001 | Reid et al. | 713/201 |
| 6,195,705 B1 | 2/2001 | Leung | 709/245 |
| 6,249,523 B1 | 6/2001 | Hrastar et al. | 370/401 |
| 6,266,385 B1 | 7/2001 | Roy et al. | 375/372 |
| 6,269,099 B1 | 7/2001 | Borella et al. | 370/389 |
| 6,282,208 B1 | 8/2001 | Bowcutt et al. | 370/486 |
| 6,330,562 B1 | 12/2001 | Boden et al. | 707/10 |
| 6,366,584 B1 | 4/2002 | Gulliford et al. | 370/403 |
| 6,370,158 B1 | 4/2002 | O'Scolai et al. | 370/503 |
| 6,373,827 B1 | 4/2002 | Tayebi et al. | 370/310 |
| 6,385,449 B2 * | 5/2002 | Eriksson et al. | 455/436 |
| 6,430,235 B1 | 8/2002 | O'Shea et al. | 375/326 |
| 6,433,742 B1 | 8/2002 | Crawford | 343/700 |
| 6,434,113 B1 | 8/2002 | Gubbi | 370/216 |
| 6,438,367 B1 | 8/2002 | Crawford | 455/410 |
| 6,438,376 B1 * | 8/2002 | Elliott et al. | 455/437 |
| 6,449,344 B1 | 9/2002 | Goldfinger et al. | 379/88.17 |
| 6,456,242 B1 | 9/2002 | Crawford | 343/700 |
| 6,456,245 B1 | 9/2002 | Crawford | 343/702 |
| 6,456,678 B2 | 9/2002 | Roy et al. | 375/372 |
| 6,463,473 B1 | 10/2002 | Gubbi | 709/225 |
| 6,483,820 B1 * | 11/2002 | Davidson et al. | 370/329 |
| 6,542,482 B1 * | 4/2003 | Johansson et al. | 370/331 |
| 2002/0038253 A1 | 3/2002 | Seaman et al. | 705/26 |
| 2002/0052960 A1 | 5/2002 | Trisno et al. | 709/226 |
| 2002/0107023 A1 | 8/2002 | Chari et al. | 455/445 |
| 2002/0138645 A1 | 9/2002 | Shinomiya et al. | 709/238 |
| 2002/0143960 A1 | 10/2002 | Goren et al. | 709/229 |

FOREIGN PATENT DOCUMENTS

| | | |
|---|---|---|
| EP | 0999717 | 12/1998 |
| WO | WO/98/39851 | 9/1998 |
| WO | WO 02/054646 | 7/2002 |
| WO | WO 02/078369 | 10/2002 |

OTHER PUBLICATIONS

Zavgren et al., "High-Throughput, Survivable Protocols for CDMA Packet-Radio Networks", Report No. 7173, BBN Systems and Technologies Corporation. Mar. 1990.

Julio Escobar, "Radio-Parameter Selection Algorithm for Receiver-Directed Packet-Radio Networks", Report No. 7172, BBN Systems and Technologies Corporation. 1990.

Stevens et al., "Suran Protocol (SURAP)", Rockwell International for DARPA, pp. 3-47. Apr. 3, 1989.

Garcia-Luna-Aceves et al., "Analysis of Routing Strategies for Packet Radio Networks", SRNTN 14, Aug. 1984, SRI International AD-A221 468, Project 5732, pp. 1-27.

Bruno et al., "Low Cost Packet Radio-Advanced Technology for Packet Radio Switching Applications" 1987 IEEE, pp. 443-448.

Fifer et al. "The Low-Cost Packet Radio" Proceedings of The IEEE, vol. 75, No. 1, Jan. 1987 pp. 33-42.

John Jubin, "Current Packet Radio Network Protocols" Rockwell International Corporation, pp. 1-7.

M. H. Enein, "Coherent Signal Processing for Packet Radio", CH 1734-3/82-0001 1982 IEEE, pp. 10.7-1 to 10.7-5.

Herring et al. "Low Cost, Miniature, Programmable Saw Matched Filter for Tactical Spread Spectrum Systems".

Storey et al., "Throughput Performance of a Direct Sequence CDMA Packet Radio Network" Stanford University, SEL Technical Report No. 85-277, pp. 1-95.

Tobagi et al., "Performance Evaluation of Channel Access Schemes in Multihop Packet Radio Networks With Regular Structure by Simulation", Stanford University, SEL Technical Report No. 85-278, pp. 1-68.

* cited by examiner

FIG. 4A

| Field | Key | Type | Units | Bytes |
|---|---|---|---|---|
| Node | X | Node ID | | 8 |
| Lattitude | | Float | Degrees | 8 |
| Longitude | | Float | Degrees | 8 |
| Laccuracy | | Integer | m | 2 |
| Orientation | | Integer | deg T | 2 |
| Oaccuracy | | Integer | deg | 2 |
| Nantenna | | Integer | | 1 |
| By | | Node ID | | 8 |
| At | | Time | Seconds | 8 |
| Sequence | | Integer | | 4 |

FIG. 4B

| Field | Key | Type | Units | Bytes |
|---|---|---|---|---|
| Node | X | Node ID | | 8 |
| Function | | Integer | none, rx, tx, ... | 1 |
| Time Slot | X | Integer | [0, m-1] | 1 |
| Frequency | | Integer | [0, n-1] | 1 |
| Antenna | | Integer | | 1 |
| Other Node | | Node ID | | 8 |
| Expiration Time | | Time | Seconds | 4 |
| Priority | | Integer | | 1 |
| By | | Node ID | | 8 |
| At | | Time | Seconds | 8 |
| Sequence | | Integer | | 4 |

FIG. 4C

| Field | Key | Type | Units | Bytes |
|---|---|---|---|---|
| Node | X | Node ID | | 8 |
| Max. Bandwidth | | Integer | KBytes/s | 2 |
| Priority | | Integer | | 1 |
| By | | Node ID | | 8 |
| At | | Time | Seconds | 8 |
| Sequence | | Integer | | 4 |

FIG. 4D

| Field | Key | Type | Units | Bytes |
|---|---|---|---|---|
| Source Node | X | Node ID | | 8 |
| Destination Node | X | Node ID | | 8 |
| Cost | | Float | | 4 |
| Dynamic | | Integer | | 1 |
| Hop | | Node IDs | | 20 x 8 |
| By | | Node ID | | 8 |
| At | | Time | Seconds | 8 |
| Sequence | | Integer | | 4 |

NETWORK CHANNEL ACCESS PROTOCOL-INTERFERENCE AND LOAD ADAPTIVE

RELATED APPLICATIONS

This application claims benefit of U.S. provisional patent application Ser. No. 60/284,678, filed Apr. 18, 2001, which is incorporated by reference.

FIELD OF THE INVENTION

The invention relates generally to networks, and more particularly to network protocols.

BACKGROUND OF THE INVENTION

Consumer appetite for access to information continues to grow along with growth of the Internet. Corresponding to such growth, new information is added to the Internet constantly. With respect to multimedia content in particular, much of this information comes at a significant cost in bandwidth.

Telephone dial-up service is being replaced with broader bandwidth systems such as satellite, digital subscriber line (DSL), and cable modem. Unfortunately, these systems are not presently available to a significant portion of the population. Moreover, acquisition and installation costs associated with these systems make them less appealing.

Accordingly, wireless connectivity is on the rise. Wireless systems may be deployed more rapidly with less cost than their wired counterparts. Systems using cellular phone technologies are directed at providing mobile wireless Internet connectivity. Unfortunately, such systems are bandwidth limited.

Alternatives to cellular telephone technologies are cellular architectures providing high speed, data only services. An example is Multi-channel, Multi-point Distribution Service (MMDS) being provided by Sprint. Benefits of wireless systems for delivering high-speed services include rapid deployment without overhead associated with installation of local wired distribution networks. Unfortunately, MMDS relies upon long range transmissions and a sophisticated customer premise installation.

What is needed is a fixed wireless solution with bandwidth comparable to DSL and cable modem technologies that is less complex to install and less costly. A mesh architecture and protocol serves these needs. In U.S. Pat. No. 5,682,382 to Shepard, a fixed wireless network is disclosed. In Shepard, the wireless network is based on a decentralized packet-radio concept using spread-spectrum technology for transmitting and receiving. Each station calculates a fixed pseudo-random schedule of transmit and receive opportunities for communication and listens for the same type of broadcast by other stations. Each station's schedule is in theory unique owing to its random or pseudo-random generation, so open spots in schedules may be found for communication opportunities by comparing such randomly or pseudo-randomly generated schedules. Only immediate neighbors for which a station will be in communication are made aware of such schedules. Accordingly, Shepard does not provide coordination of use of channel space and has limited ability to adjust for significant changes in traffic or load.

Therefore, it would be desirable to provide increased coordination of channel space use to mitigate against interference with other nodes and to adjust for significant changes in load. Moreover, it would be desirable to locally coordinate such channel space use and provide dynamic allocation of channel space.

SUMMARY OF THE INVENTION

The present invention provides local coordination and dynamic allocation of channel space to avoid interference and to adjust for changes in load. An aspect of the present invention is a channel space allocation protocol for a mesh network architecture. A sufficient number of communication slots need to be allocated to support transmission of a load of data packets, and this is done locally at each node for distributed access control. Moreover, allocation of such communication slots is checked periodically for dynamic allocation of bandwidth.

An aspect of the present invention is a method for locally determining channel access to avoid interference for communicating from a node to another node in a network of nodes. More particularly, a collection of information is provided to the node. Interference is checked for using the collection of information, and a portion of a channel is identified to avoid the interference.

Another aspect of the present invention is a method for determining communication slot allocation. More particularly, an array is provided. Whether there is at least one conflict for a planned transmission at a first node is determined. The array is amended in response to the at least one conflict identified at the first node. Whether there is at least one conflict for the planned transmission at a second node is determined. The array is amended in response to the at least one conflict identified at the second node. First potential interference between the first node and a first other node within an interference area of the first node is identified for the planned transmission. The array is amended in response to the potential interference identified. Second potential interference between the second node and a second other node within an interference area of the second node is identified for the planned transmission. The array is amended in response to the second potential interference identified. Third potential interference, which would mitigate against selecting at least one communication slot for allocation thereof, is identified for the planned transmission. The array is amended in response to the third potential interference identified. The at least one communication slot is selected using the array as amended for allocation of the at least one communication slot for the planned transmission.

Another aspect of the present invention is a method for determining self-conflicts between a transmitting node and a receiving node. More particularly, an array is provided, and a communication slot is obtained. The transmitting node and the receiving node are checked to determine if either or both is pre-allocated to transmit or receive during the communication slot. If either or both the transmitting node and the receiving node are pre-allocated to transmit or receive during the communication slot, priority of each pre-allocation is checked against priority of transmission from the transmitting node to the receiving node.

Another aspect of the present invention is a method for determining intranetwork conflicts for a planned transmission from a transmitting node to a receiving node. More particularly, an array is provided. A first node not the transmitting node or the receiving node is obtained, and a communication slot is obtained. It is determined whether the first node is pre-allocated to receive during the communication slot. If the first node is pre-allocated to receive during the communication slot, the pre-allocated priority of the first node is checked against priority of the planned transmission. If the priority of the planned transmission is not greater than the pre-allocated priority of the first node, it is determined whether a power level for the planned transmission is of sufficient strength to interfere with reception during the communication slot of the first node.

Another aspect of the present invention is a method for determining intranetwork conflicts for a planned transmission from a transmitting node to a receiving node. More particularly, an array is provided, and a first node not the transmitting node or the receiving node is obtained. A communication slot is obtained. It is determined whether the first node is pre-allocated to transmit during the communication slot. If the first node is pre-allocated to transmit during the communication slot, priorities of the pre-allocated transmission and the planned transmission are compared. If the priority of the planned transmission is not greater than the pre-allocated transmission priority, it is determined whether a power level for the pre-allocated transmission by the first node is likely to interfere with reception by the receiving node of the planned transmission.

The above as well as additional aspects of the present invention will become apparent in the following detailed written description.

BRIEF DESCRIPTION OF THE DRAWINGS

The teachings of the present invention can be readily understood by considering the following detailed description in conjunction with the accompanying drawings, in which:

FIGS. 4A through 4D are exemplary tables of data records in accordance with an aspect of the present invention;

To facilitate understanding, identical reference numerals have been used, where possible, to designate identical elements that are common to the figures.

DETAILED DESCRIPTION

Mesh Architecture

Figure 1:
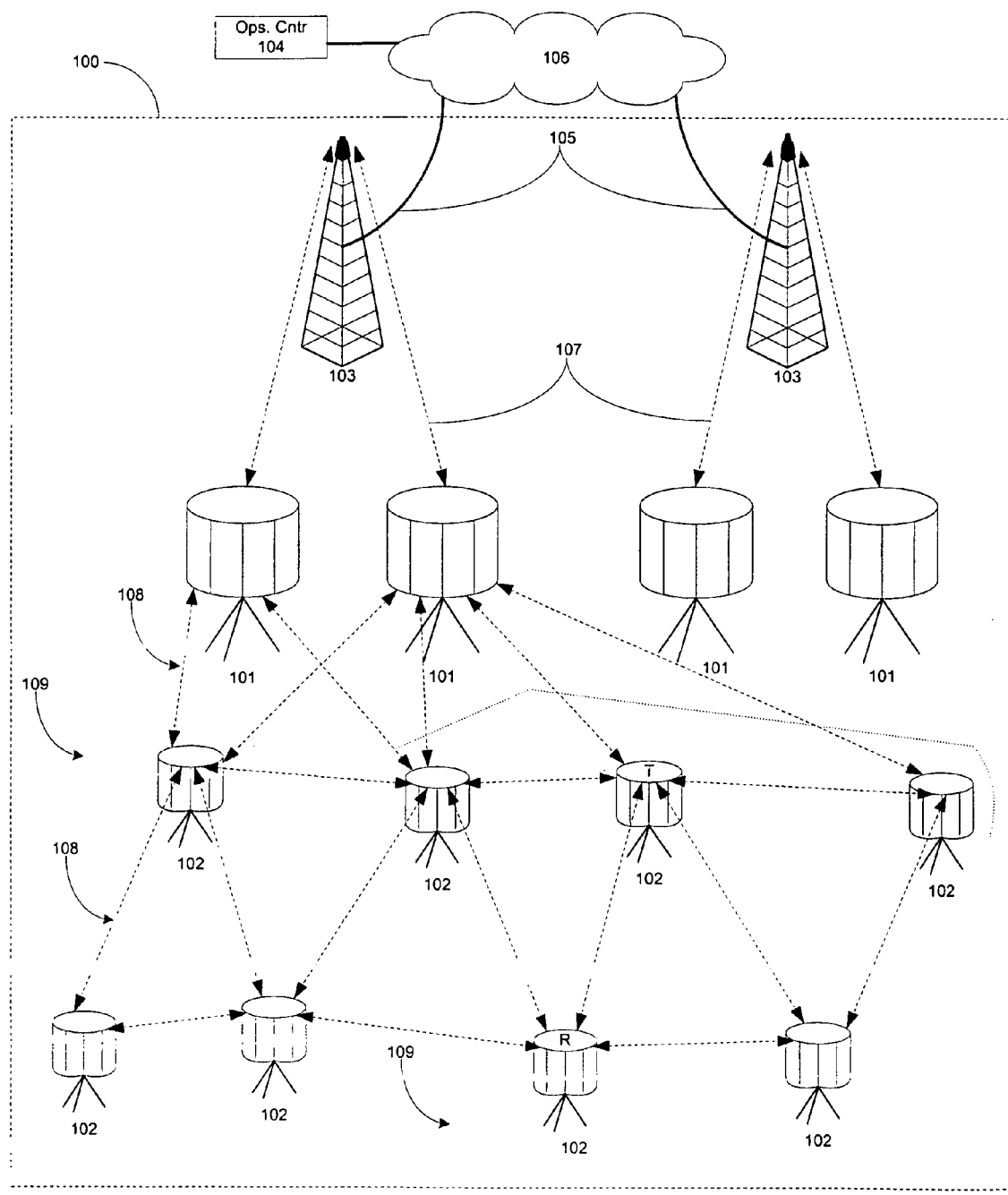
FIG. 1 is a network diagram depicting an exemplary portion of a network in accordance with an aspect of the present invention.

FIG. 1 is a network diagram depicting an exemplary portion of a network 100 in accordance with an aspect of the present invention. Network 100 comprises network access concentrators (SNAPs) 103, network access points (NAPs) 101 and network access nodes 102. Network 100 traffic may be routed from a network access node 102 to a neighboring network access node 102. Such a neighboring network access node 102 may route such traffic to one of its neighboring network access nodes 102 and so on until a NAP 101 or a final destination network access node 102 is reached. Notably, nodes 102 may be in communication with one another but not with any node 101 to form a private wireless network.

SNAPs 103 may be coupled to various backhauls 105, which backhauls 105 may be coupled to network 106. Network 106 may be coupled to an operations center (OC) 104. Backhauls 105 may form a part of network 106. Network 106 may comprise a portion of the Internet, a private network, or the like. By private network, it is meant a network not connected to the Internet.

NAPs 101 may be in communication with SNAPs 103 or network 106 via backhaul communication links 107. It should be understood that backhauls may be wired or wireless. In particular, backhauls coupled to NAPs 101 may have a wireless backhaul. In an embodiment, point-to-point communication is used as between a SNAP 103 and a NAP 101 in the Unlicensed National Information Infrastructure (UNII) band. Though, at locations where wired connectivity is available, wired connectivity may be used.

Network access nodes 102 are in wireless communication with at least one NAP 101 or node 102. It should be understood that nodes 102 or NAPs 101 may be configured for any of or some combination of broadcasting, point-to-point communication, and multicasting. By broadcasting, it is meant transmitting without singling out any particular target recipient among a potential audience of one or more recipients. By point-to-point communication, it is meant transmitting with singling out a particular target recipient among a potential audience of one or more recipients. By multicasting, it is meant transmitting with singling out a plurality of particular target recipients among a potential audience of recipients. For purposes of clarity, communication between nodes 102, between NAPs 101, or between a NAP 101 and a node 102, described below is done in terms of point-to-point communication.

In one embodiment, this is done using radio communication in the UNII band. However, other known bands may be used. Nodes 102 form, at least in part, a Wide Area Network (WAN) using in part wireless interlinks 108. More particularly, IEEE 802.11a physical and link layer standards may be employed for communication in a range of 9 to 54 megabits per second (Mbits/s).

Communication slots as described herein are time slots with associated frequencies. However, one of ordinary skill in the art will understand that other types of communication spaces may be used, including without limitation codes, channels, and the like. Referring to FIG. 1, NAPs 101 and nodes 102 communicate with one another and with each other by sending and receiving information during short time slots referenced to the beginning of a frame. Each frame is approximately a same length of time. By way of example and not limitation, each frame may be approximately one second long, approximately beginning and ending on each second. Notably, one or more time slots may exist within a frame. By way of example and not limitation, if a time slot has a length of approximately one millisecond, then approximately 1000 time slots may be available within a frame. Moreover, a frame may be divided into subframes, as is known. For example, a 1 second frame may be divided into five 200 one-millisecond subframes, each of which contains 200 ms slots.

Each node 102 and NAP 101 operates to a same time reference as each other node and NAP in network 100, whether such time reference is a true time or an arbitrary synch time. A reference time may be obtained by satellite using GPS 310 of FIG. 3. Alternatively, a frame reference signal may be transmitted between nodes at the beginning of a frame using a special purpose time slot. By way of example and not limitation, such a special purpose time slot may be approximately 200 microseconds in duration for transmission of approximately a one-microsecond pulse.

Figure 2:
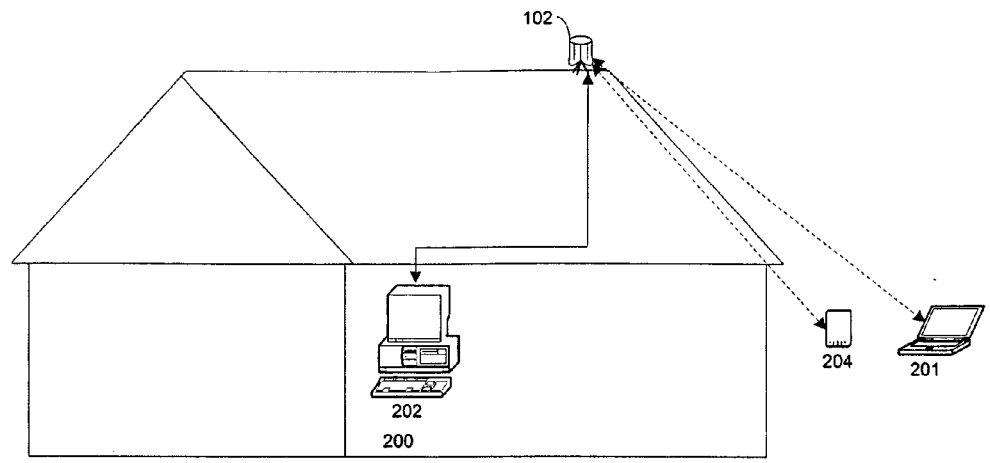
FIG. 2 is a diagram of a house having consumer premises equipment (CPE) including computers and a node in accordance with an aspect of the present invention.

Nodes 102 may be located on roof-tops, for example as on a building 200 illustratively shown in FIG. 2, in windows, in attics, on a pole, on a telephone pole, and the like. In FIG. 2, building 200 may house any of a variety of devices such as computers, printers, set-top boxes, PDAs, and like devices, namely Customer Premises Equipment (CPE), having network connectivity capability, including without limitation connectivity to the Internet. For purposes of illustration, computer 202 is shown wired to node 102, and notebook computer 201 and PDA 204 are shown using wireless connectivity such as a wireless local area network (WLAN) By way of example, node 102 may comprise a 2.4 GHz PCMCIA LAN "card" for the WLAN portion and a 100baseT or 10baseT Ethernet "card" for the wired connectivity portion. By "card," it is meant to include integrated circuit chip or a printed circuit board comprising one or more integrated circuit chips. Such wired and wireless interfaces form a portion of interface 309, as illustratively shown in FIG. 3.

Figure 3:
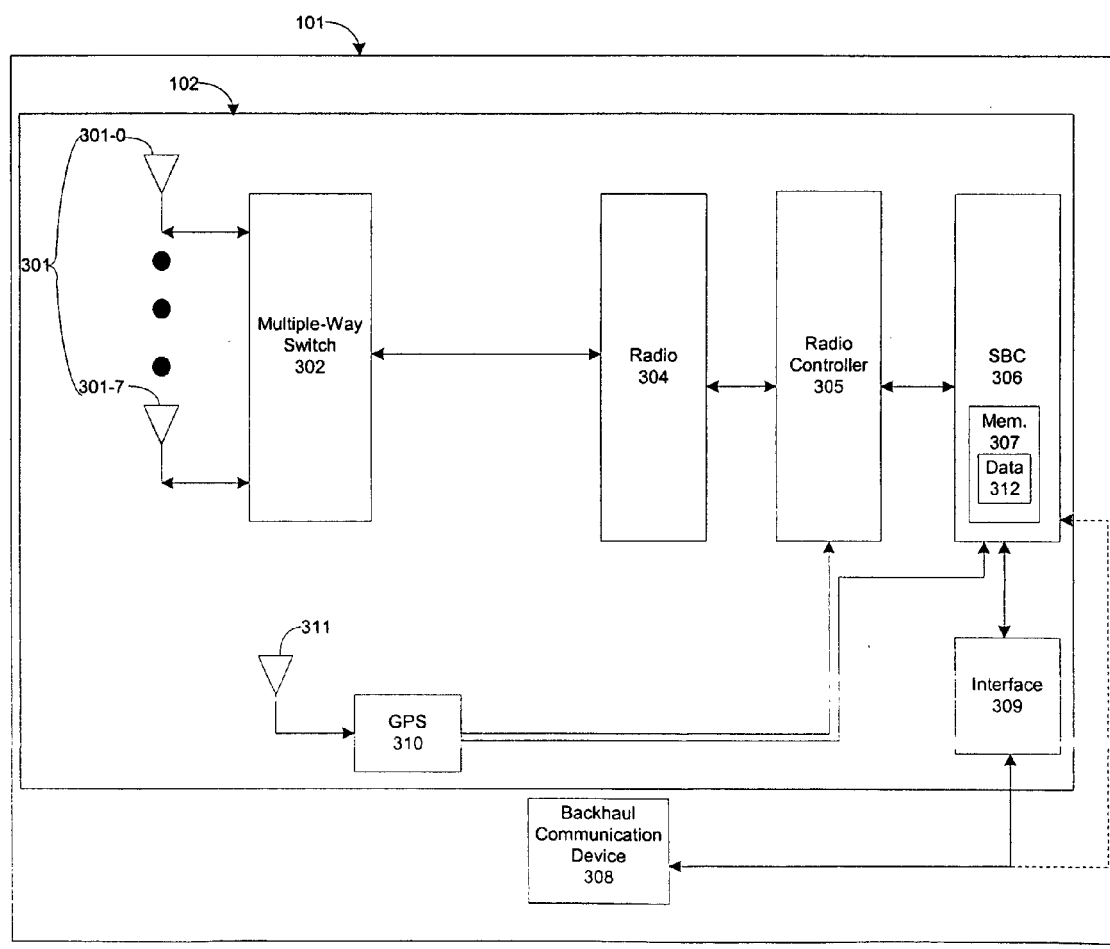
FIG. 3 is a block diagram of an exemplary portion of a network access point (NAP) or a node in accordance with an aspect of the present invention.

Referring to FIG. 3, there is shown a block diagram of exemplary portions of NAP 101 and node 102 in accordance with aspects of the present invention. A NAP 101 comprises a node 102 operatively coupled to a backhaul communication device 308. NAPs 101 and nodes 102 are hereinafter collectively referred to as nodes 300.

Multi-sectored antenna 301 comprises sectors 301-0 to 301-7. Though an eight-sectored antenna 301 is illustratively described herein, antenna 301 may comprise fewer or more sectors than eight, namely, 1 to q sectors for q an integer. Though a sectored antenna is described, other antenna configurations may be used, including but not limited to an omni-directional antenna, a collection of individually pointed directional antennas, a combination of a sectored antenna and an omni-directional antenna, and the like.

Antenna 301 is coupled to multi-pole switch 302 for selectively accessing a sector of sectors 301-0 through 301-7. Sectors 301-0 through 301-7 may be arranged in banks, such that multi-pole switch 302 may be used to select such a bank. Switch 302 is coupled to transceiver (hereinafter "radio") 304. In an embodiment, radio 304 may be implemented using a 5.8 GHz UNII band radio. However, other radios with other frequencies may be used.

Radio 304 is coupled to radio controller 305. In an embodiment, radio controller 305 may be implemented using a field programmable gate array. Radio controller 305 is coupled to a single board computer (SBC) 306. SBC 306 comprise a processor and memory 307 capable of storing a data structure 312. SBC 306 is configured for routing traffic, and in this context may be considered a router.

SBC 306 is coupled to interface 309. Interface 309 may comprise a WLAN card, an Ethernet card, or the like as mentioned above. Backhaul communication device 308 may be coupled to SBC 306 via interface 309 or optionally directly coupled to SBC 306. Backhaul communication device 308 depends on the type of backhaul used, as mentioned elsewhere herein such a backhaul may be wired or wireless.

Optionally, a Global Positioning System (GPS) card 310 and antenna 311 may be used. GPS antenna 311 is coupled to GPS card 310. GPS card 310 is coupled to radio controller 305 and SBC 306.

Each node 300 may have at least one neighboring node 300. By neighboring nodes, it is meant other nodes 300 with which a node 300 may be put in direct communication. By way of example, if A, B and C are nodes, and A must communicate through B in order to communicate with C, then A and B are neighbors, B and C are neighbors, and A and C are not neighbors.

Each node 300 maintains a database of information regarding nodes in its vicinity. Such a database may be stored in memory 307 in a form of a data structure 312. This database may be shared among nodes 300 in an interference area. By interference area, it is meant a region about a node in which communication to or from said node may be interfered with by another node. In other words, an interference area is an area about a node 300 in which such node's radio transmissions may be heard or may cause interference with another transmission. This area is conveniently approximated by a radius, r, about such a node 300. Radius, r, may be estimated using an RF propagation model and is dependent on frequency band and transmit power among other factors, including but not limited to terrain, vegetation, buildings, and the like.

Sharing information can occur by a node 300 transmitting over interlinks 108 information to neighboring nodes 300, which may retransmit such information to their neighboring nodes 300, and so on. Such a database may comprise information on node location, antenna direction, slot usage, control parameters, routing, among other types of information. Examples of data records are illustratively shown in FIGS. 4A through 4D.

Information in FIGS. 4A through 4D is provided by way of example, and accordingly other fields and field information types and values may be used. Each example data record comprises a "Field," "Key," "Type," "Units," and "Bytes" column. "Field" indicates a type of information for a field. "Key" indicates a key field in a database. "Type" indicates an informational type for describing field information, such as node identification, integer, time, and floating point value. "Units" indicates units for such field information. "Bytes" indicate storage space allocated for such field information.

A "Node" field identifies a node for which a respective data record pertains. An "At" field designates a time at which a data record was created or modified. A "By" field indicates which node created or modified such a data record. A "Sequence" field in each record indicates an incremented record number and is for a repair protocol, in particular for establishment of a database on a node to network 100.

Data record 401 of FIG. 4A is a locator record and comprises "Latitude" and "Longitude" fields, among other fields previously described herein. A "Latitude" field indicates a latitudinal position of a node for which data record 401 pertains, and a "Longitude" field indicates longitudinal position for such a node. This information may be obtained from a GPS among other sources of such information. Field "laccuracy" is accuracy in meters of a location estimate. In other words, a node is within so many meters of a specified latitude and longitude. Field "nantenna" is a number of antenna sectors. Field "orientation" is a direction in which an antenna sector, for example sector 0, is pointing. This value is in degrees relative to true north. With a fixed array of equally spaced antenna sectors, orientations of other sectors may be computed using fields "nantenna" and "orientation". Field "oaccuracy" is accuracy in degrees of an orientation estimate. Using information from data record 401, antenna azimuth and beam width may be derived by node 300.

Data record 402 of FIG. 4B is a slot usage data record. Data record 402 is updated to allocate or deallocate a communication slot. Any node 300 shown in FIG. 3, in particular a transmitting node, may update data record 402. Updates to slot allocation records may be made in transmitting, tx, and receiving, rx, record pairs. Data record 402 comprises "Function," "Time Slot," "Frequency," "Antenna," "Other Node," and "Expiration Time" fields, among other fields previously described herein.

A "Function" field indicates a function for a communication slot, such as not presently allocated ("none"), transmit, or receive.

A "Time Slot" field indicates a selected time slot t from 0 to m−1 of m time slots for execution of a transmit or a receive function.

A "Frequency" field indicates a select frequency f from 0 to n−1 of n frequencies for execution of a transmit or a receive function.

An "Antenna" field indicates a sector selected for execution of a transmit or a receive function.

An "Other Node" field identifies a target recipient node for a message. However, other node field could be a multicast or a broadcast indicator.

An "Expiration Time" field indicates an expiration time for allocation of a slot for a function. After expiration time has lapsed, nodes treat function for data record 402 as "none." However, prior to lapsing, expiration time may be reset for additional communication slot usage.

A "Priority" field indicates a priority value for slot allocation. If all slots are allocated, priority may be given to one subscriber over another based on a priority value. This priority value may be from 0 to some integer p.

Data record 403 of FIG. 4C is a control parameter data record. In addition to Node, Priority, By, At and Sequence fields previously described, data record 403 comprises a "Max. Bandwidth" field which indicates a maximum bandwidth limit allocated to a node identified in such a data record.

Data record 404 of FIG. 4D is a routing cost data record. In addition to By, At and Sequence fields previously described, data record 404 comprises "Source Node", "Destination Node", "Cost" and "Dynamic" fields. A "Source Node" field indicates a source node or a beginning point on a route. A "Destination Node" field indicates a target destination of such a route, namely, a final destination for such a route. A "Dynamic" field indicates whether dynamic or static routing is to be used. A "hop" field indicates a route selected from one or more known routes for routing traffic from a source node to a destination node.

A "Cost" field indicates a determined cost for sending such a message from a source node to a destination node. Such a cost may be statically or dynamically determined.

It should be understood that data records illustratively shown in FIGS. 4A through 4D are not meant to include all possible data records. Other data records may include current and alternative routes, control and status information, distance and azimuth between each pair of nodes, among others. Furthermore, it should be understood that one or more fields illustratively shown may be omitted in implementing one or more aspects of the present invention. Moreover, it should be understood that nodes 300 each maintain a portion of a database for network 100, and thus a shared or distributed database among nodes is provided. Furthermore, it should be appreciated that network 100 may function without centralized control.

It should be understood that a mesh architecture in accordance with an aspect of the present invention is herein disclosed. This architecture uses packet-based transmission of data. Each node 300 of FIG. 1 provides a router for communicating traffic. Accordingly, protocols are needed to implement such a mesh architecture. For example, when a node 300 determines to route traffic to a particular next hop, data packets begin accumulating at that node for transmission to such a next hop. A sufficient number of communication slots need to be allocated to support transmission of such a load of data packets, and this is done locally at each node 300 for distributed access control as disclosed in more detail below. Moreover, as network 100 is dynamic, allocation of slots is checked and adjusted periodically by comparing to current estimates of load, as disclosed below in more detail.

Transmission Load

Figure 5A:
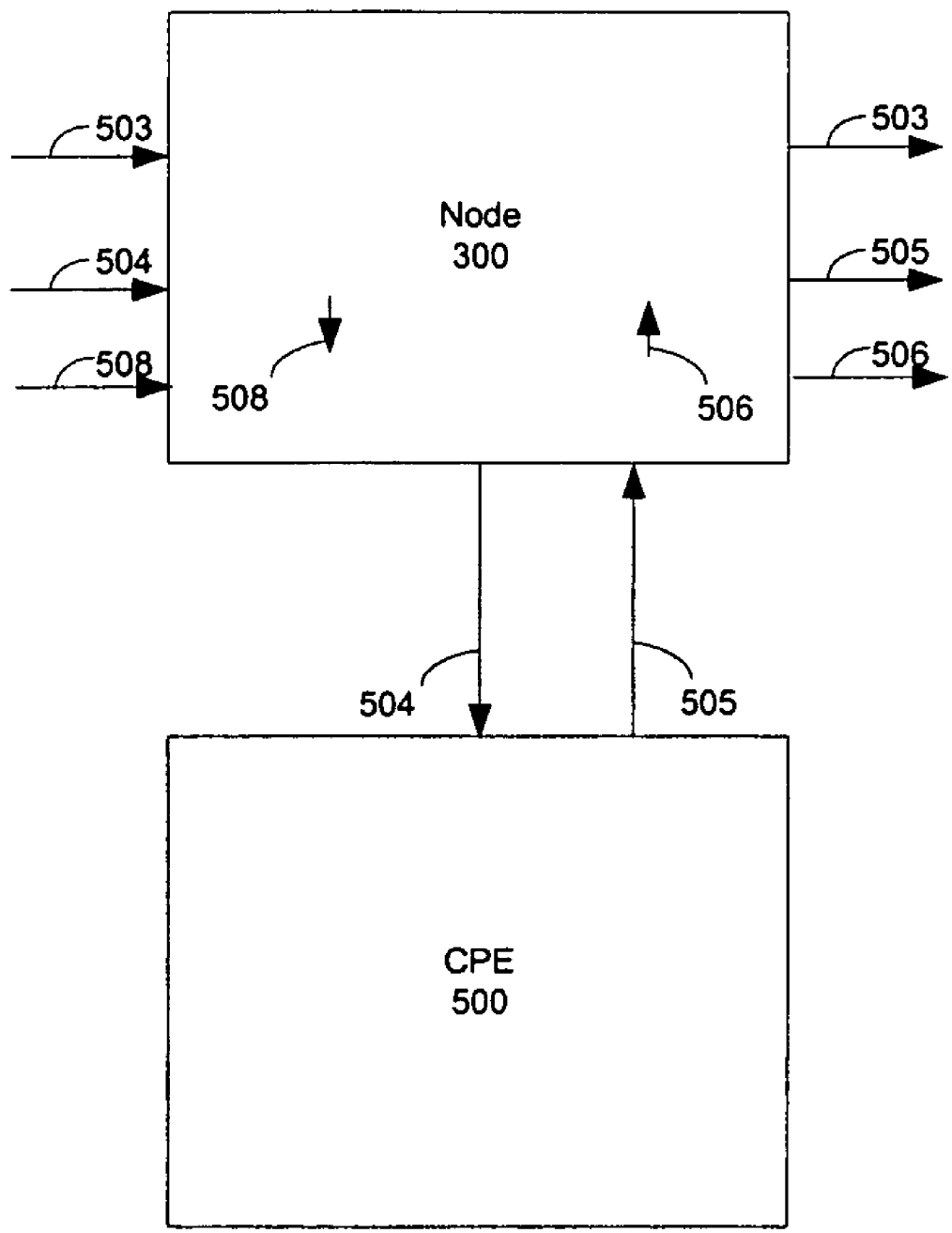
FIG. 5A is a block diagram of communication flow in accordance with an aspect of the present invention.

Referring to FIG. 5A, there is shown a block diagram of transmission load flow in accordance with an aspect of the present invention. Basically, three types of incoming transmissions are received at node 300, namely transmissions where node 300 is an intended recipient of information, as indicated by arrows 508; transmissions where node 300 is used to forward information, as indicated by arrows 503; and transmissions where node 300 receives information for CPE 500 as indicated by arrows 504.

Information associated with arrows 504 may be sent to CPE 500 as indicated. Additionally, CPE 500 may provide information for transmission to node 300, as indicated by arrows 505. Node 300 may have to transmit overhead information, as indicated by arrows 506, or receive overhead information as indicated by arrows 508. Such overhead information may include information to maintain network 100 including sharing of database information and the like. Notably, program 510 of FIG. 5B measures incoming traffic to be relayed by node 300, as indicated by arrow 503, and outgoing traffic, either from CPE 500 or overhead traffic, to be sent by node 300, as indicated by arrows 505 and 506, as explained below. Though an example of measurement locations is provided, other approaches to measuring traffic load may be used.

Figure 5B:
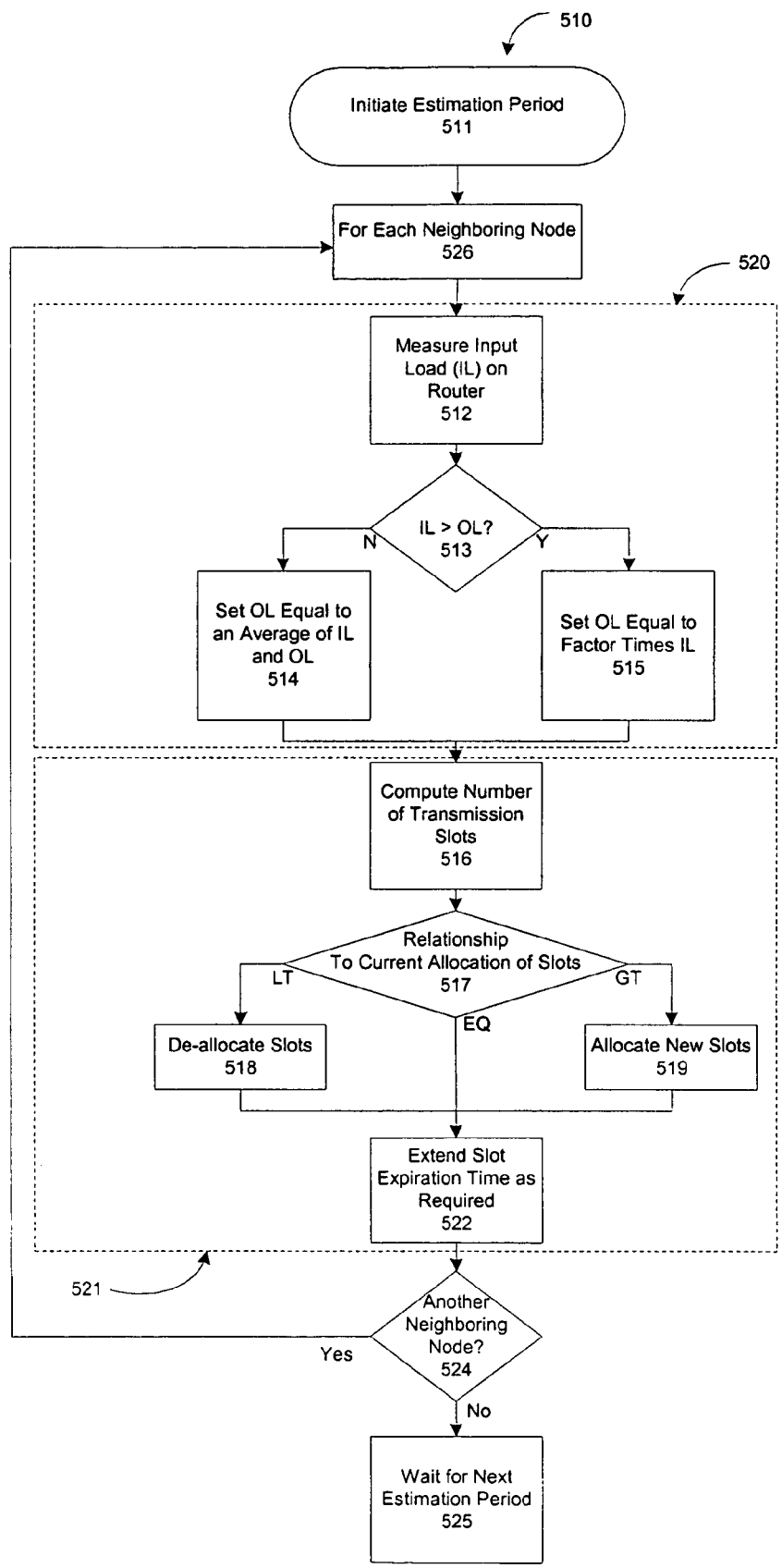
FIG. 5B is a flow diagram of an exemplary communication load program in accordance with an aspect of the present invention.

Referring to FIG. 5B, there is shown a flow diagram of an exemplary transmission load program 510 in accordance with an aspect of the present invention. With continuing reference to FIG. 5B and renewed reference to FIGS. 3 and 5A, operation of program 510 is described. Program 510 provides estimates for communication slot needs of a node 300 for communication to each neighboring node 300. Program 510 may be resident at each node 300, for example in memory 307.

Program 510 comprises program portions 520 and 521. Program portion 520 is for estimating what a transmission output load (OL) may be in the near future, approximately 1 to 30 seconds in the future. Program portion 521 is for determining a slot allocation based on such an estimated OL obtained from program portion 520.

Program 510 is initialized at step 511. This initialization begins a current estimation period. A subsequent estimation may follow at a predetermined time interval after the starting time for a current estimation. Such a time interval may be in a range of approximately 0.1 to 10 seconds after initiation of such a current estimation. Notably, it is assumed that nodes 300 of FIG. 3 have already joined network 100. A network joining protocol is disclosed in more detail below herein.

At step 526, a neighboring node of a group of neighboring nodes is selected.

At step 512, incoming traffic or input load (IL) for such a neighboring node selected at step 526 is determined. This determination may be made by measuring load at selected locations. For example, as mentioned above with respect to FIG. 5A, IL may be provided by adding together incoming traffic to node 300 to be forwarded to such a neighboring node identified at step 511, outgoing traffic from CPE 500 to be sent to such a neighboring node identified at step 511, and overhead traffic from node 300 to be sent to such a neighboring node identified at step 511. However, other combinations and types of loads may be used to provide an IL.

At step 513, IL determined at step 512 is compared against OL. If IL is less than or equal to OL, then at step 514, a new value for OL is set according to:

$$OL = [t*(IL) + (1-t)(OL)], \quad (1)$$

where t is an adjustable time constant in a range of 0.0 to 1.0. By way of example and not limitation, t may be set equal to approximately 0.3. Higher values of t yield a more responsive estimate, while lower values provide a smoother estimate.

If, however, IL is greater than OL, then at step 515, a new value for OL is set equal to a factor k times IL from step 512, namely:

$$OL = k*IL, \quad (2)$$

where k is generally somewhat greater than 1. Thus, the estimate of OL is highly responsive to large rises in IL, but decays exponentially when IL falls off.

At step 516, a number of communication slots is estimated using OL obtained at step 514 or 515. This estimation is, Slots Required = OL/[(Slot Length)(Data Rate)]. (3)

Notably, an embodiment of equal slot lengths is described. However, it should be understood that variable slot lengths may be used. For example, a slot length may be in a range of approximately a couple hundred microseconds to several milliseconds. In an embodiment described herein, a 1 ms slot length is used.

At step 517, the number of communication slots computed at step 516 is compared to a number of communication slots currently allocated for communicating with such a neighboring node. If the estimated number of slots is less than the currently allocated number of slots, then at step 518, the number of slots allocated is decreased. The number of slots deallocated may be done based on priority. For example, one or more slots, starting from a lowest priority, may be deallocated. Moreover, if a slot selected for deallocation is due to expire within a short period, for example approximately 0 to 20 seconds, it may not be necessary to explicitly deallocate such a slot, as such a slot will be deallocated automatically by all affected nodes at such an expiration time.

If, however, the estimated number of slots at step 516 is greater than a number of currently allocated slots for communication with such a neighboring node, then at step 519, slot allocation may be increased. If at step 519 there are not a sufficient number of free slots to be allocated, then currently allocated slot usage may be overridden based on priority. Using priority to override a slot allocation is described in more detail below.

If current slot allocation equals the estimated number of slots at step 516, then no change in allocation is made, as indicated by progression from step 517 to step 522.

At step 522, expiration time of allocated slots for such a neighbor is checked. For each slot scheduled to expire soon, for example within approximately 0 to 20 seconds, slot expiration time is extended.

At step 524, a check for a next neighboring node 300 is made. If there is another neighboring node 300, then program 510 continues at step 526.

If at step 524 no other neighboring node 300 is to be processed, then at step 525, program 510 is paused until the above-mentioned predetermined time has lapsed. In other words, program 510 waits for a next estimation period to begin, upon which program 510 begins a subsequent iteration at step 526 by measuring an IL value anew.

Slot Availability

Figure 6A:
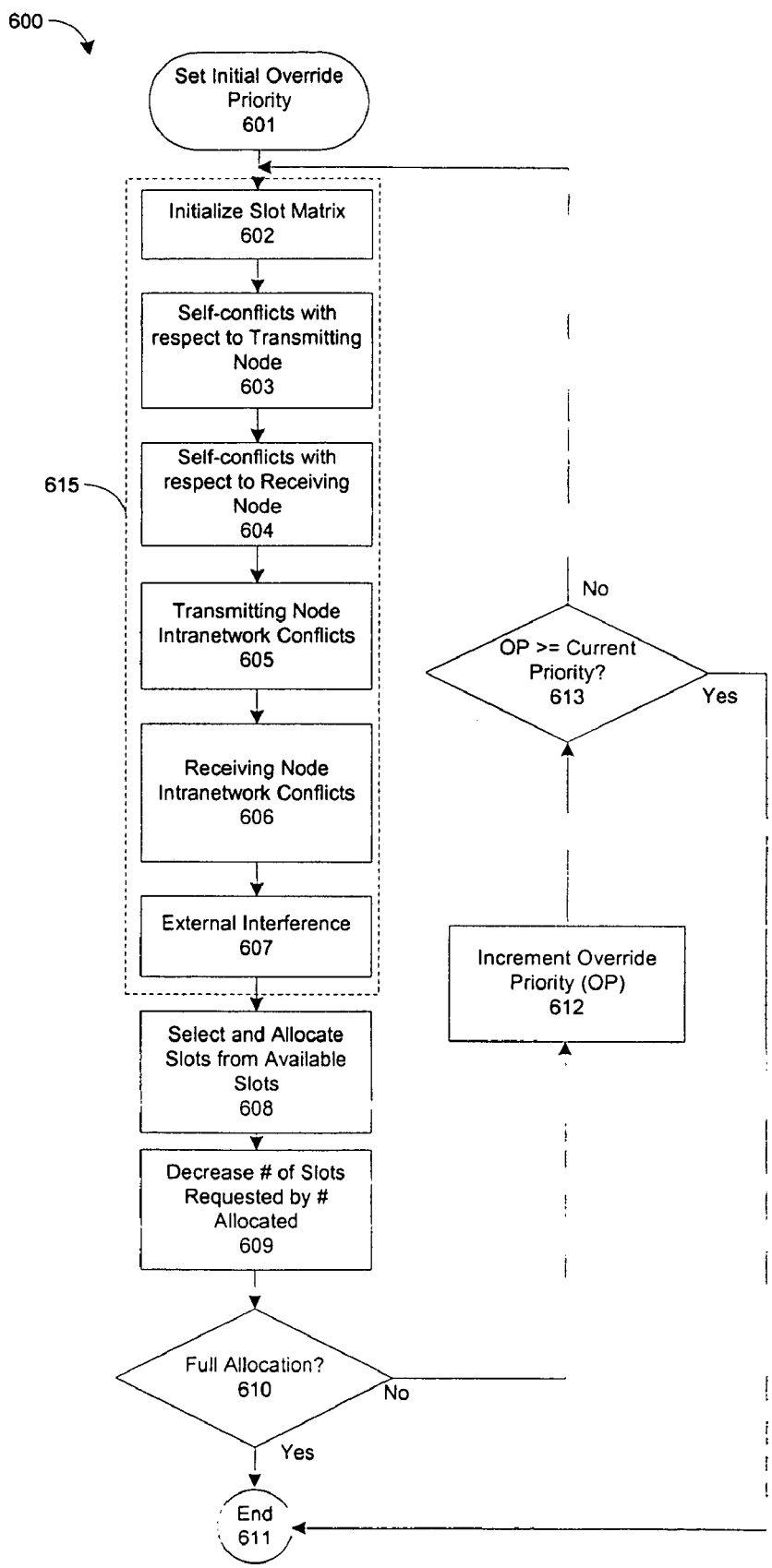
FIG. 6A is a flow diagram of an exemplary slot allocation program in accordance with an aspect of the present invention.

As mentioned above with respect to step 519, additional slots are allocated to handle an estimated output load. FIG. 6A is a flow diagram of an exemplary slot allocation program 600 in accordance with an aspect of the present invention.

Step 519 of FIG. 5B may comprise or invoke program 600. Program 600 may be employed either for a message destination or a receiving node, R, or for a message originating or a transmitting node, T. For purposes of clarity, program 600 is described for determination of slot allocation at a transmitting node T; however, it will be apparent to those of skill in the art of the present invention that program 600 may be used to determine slot allocation at a receiving node, R. Program 600 may be resident in memory 307 of FIG. 3.

At step 601, override priority is set to the lowest priority. Thus, a first attempt at slot allocation will not override any existing allocations as will become apparent.

At step 602, an m-by-n array for times and frequencies, respectively, is created and filled with zeros. Again, as mentioned above, communication space may be defined by parameters other than time and frequency. Moreover, by array, it is meant to include a table, a list, and the like.

At step 603, one or more slot allocation already made at T are identified as one or more "self-conflicts" respectively. At step 604, one or more slot allocations already made at R are identified by T as one or more "self-conflicts" respectively. Allocations at T or R, which might conflict with transmission from T to R, are termed "self-conflicts." For multicasting, each R is checked for self-conflicts. Conflicts or interference internal to network 100 of FIG. 1, not "self-conflicts," are termed "intranetwork" conflicts or interference, and all other conflicts or interference not "self-conflicts" or "intranetwork" interference are termed "external" conflicts or interference. Self-conflicts, intranetwork interference and external interference are operationally defined in more detail below.

At steps 603 and 604, respectively, time slots associated with "self-conflicts" are marked as unavailable by incrementing respective locations in the array of step 602, for example from zero to one, or one to two, and so on. Moreover, a priority check may be done for availability by priority override, as described below in more detail.

At step 605, each node 300 (shown in FIG. 3), other than T and R, is checked to determine if it has a transmit slot allocation that may interfere with T transmitting to R or vice versa. Again, for multicasting there will be a plurality of receiving nodes R or vice versa. These conflicts are identified as "intranetwork" conflicts. These nodes 300 (shown in FIG. 3) are limited to nodes within an interference area. Slots associated with such intranetwork interference are marked as unavailable by incrementing respective locations in the array of step 602. Moreover, a priority check may be done for availability by priority override, as described below in more detail.

At step 606, each node 300 (shown in FIG. 3), other than T and R, is checked to determine if it has a receive slot allocation that may be conflicted with by transmitting to R. Again, for multicasting, there will be a plurality of receiving nodes R. These nodes 300 (shown in FIG. 3) are limited to nodes within an interference area. At step 606, time slots associated with such intranetwork interference are marked as unavailable by incrementing respective locations in the array of step 602. Moreover, a priority check may be done for availability by priority override, as described below in more detail.

At step 607, time slots compromised by "external" conflicts are identified. Such "external" interference may be due to other in-band users. Detection of such external interference is described below in more detail. Such time slots associated with external conflicts are identified, and accordingly respective locations in the array of step 602 are incremented.

If there are one or more self-conflicts, intranetwork interference, and "external" interference, the array of step 602 comprises non-zero entries associated with such conflicts and interference. If there are no conflicts for some of the communication slots, then the array of step 602 will have zero entries for those slots indicating that they are available.

Figure 6B:
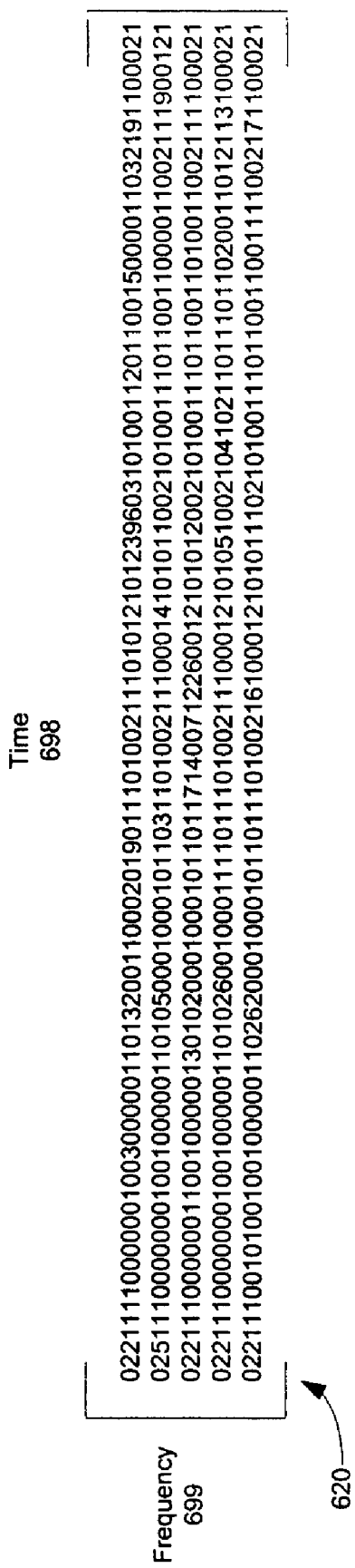
FIG. 6B is an exemplary frequency versus time slot matrix after processing in accordance with an aspect of the present invention.

An example of a resultant array 620 is illustratively shown in FIG. 6B for frequency 699 versus time 698. Steps 602 through 607 comprise interference and conflict identification portion 615 of program 600. Notably, the order of steps 603 through 607 is not binding and may be altered.

At step 608, communication slots are selected and allocated from those slots remaining available. Any element in the array of step 602 that remains a zero is available for use between T and R, or, in a multicasting embodiment, for use between T and Rs. Such selection may be done in a pseudo-random manner. The number of communication slots needing to be allocated is determined by program 510 of FIG. 5B, as described above. At step 609, the number of slots requested to be allocated in program 510 of FIG. 5B is decreased by the number of slots allocated at step 608.

At step 610, a determination is made as to whether the number of communication slots allocated at step 608 was sufficient. If a sufficient number of communication slots have been allocated, then program 600 ends at step 611. If however, a sufficient number of communication slots have not been allocated, then step 610 proceeds to step 612. In other words, there presently is an insufficient number of time slots available to support an output load estimated in program 510 of FIG. 5 without overriding one or more existing slot allocations.

If not enough slots were allocated at step 610, then at step 612 override priority is incremented. At step 613, a check is made to determine if override priority is greater than or equal to priority of a next slot allocation attempt to fulfill this ongoing allocation effort. If override priority is less than priority of a next slot allocation attempt, then program 600 begins anew at step 602.

If, however, override priority equals or is greater than priority of a next slot allocation attempt, then at step 611, program 600 ends. Accordingly, it should be understood that program 600 may end with having made only a partial allocation or no allocation at all. In other words, network 100 may be congested, in which case there may not be enough communication slots available for sending an estimated output load.

Slot Availability and Self-Conflicts

Figure 7:
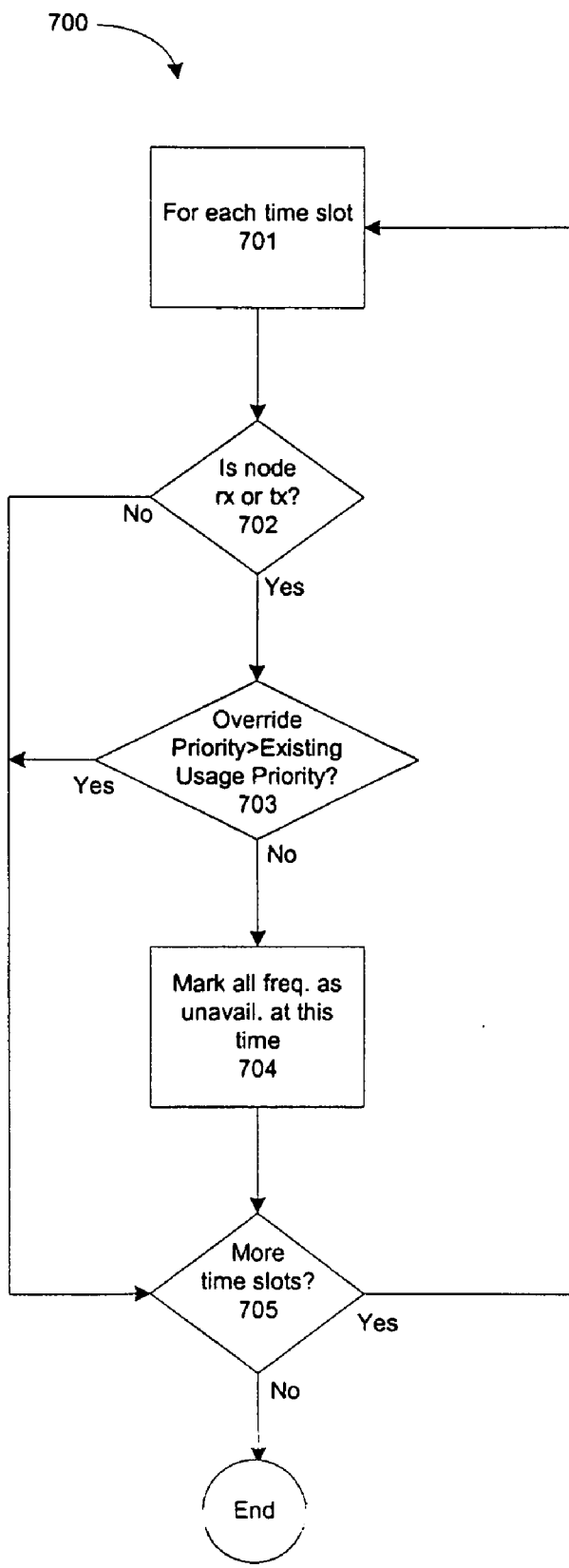
FIG. 7 is a flow diagram of an exemplary self-conflicts program in accordance with an aspect of the present invention.

In FIG. 7, there is shown a flow diagram of an exemplary self-conflicts program 700 in accordance with an aspect of the present invention. With continuing reference to FIG. 7 and renewed reference to FIG. 6A, step 603 may be replaced by steps 701 through 705.

At step 701, an initial time slot is obtained.

At step 702, T is checked to determine if it has been pre-allocated to transmit or receive during the time slot obtained from step 701, as applicable. If T is not pre-allocated for transmitting or receiving during such a time slot, then a check for a next time slot is made at step 705. Thus, the array from step 602 is left unchanged for all frequencies in this time slot.

If, however, T is pre-allocated for transmitting or receiving during such a time slot, then this indicates a self-conflict. At step 703 a priority check is made. If override priority is greater than the existing usage priority, then a check for a next time slot is made at step 705. Thus, the array from step 602 is not incremented indicating availability of all frequencies in this time slot.

If, however, override priority is equal to or less than priority of the existing usage priority, then this time slot and all frequencies in this time slot are marked as unavailable at step 704 by incrementing those locations in the array of step 602.

At step 705, a determination is made as to whether there is at least one more time slot to be checked for self-conflicts. If so, then at step 701 another time slot is obtained. If, however, there is no other time slot left to be checked for a self-conflict, then program 700 ends.

With continuing reference to FIGS. 6A and 7, T may be replaced with R in steps 701 through 705, and then step 604 may be replaced by steps 701 through 705 checking for self-conflicts of R instead of T. Moreover, steps 701 through 705 may be done for each R in a multicasting embodiment.

Slot Availability and Intranetwork Interference

Figure 8:
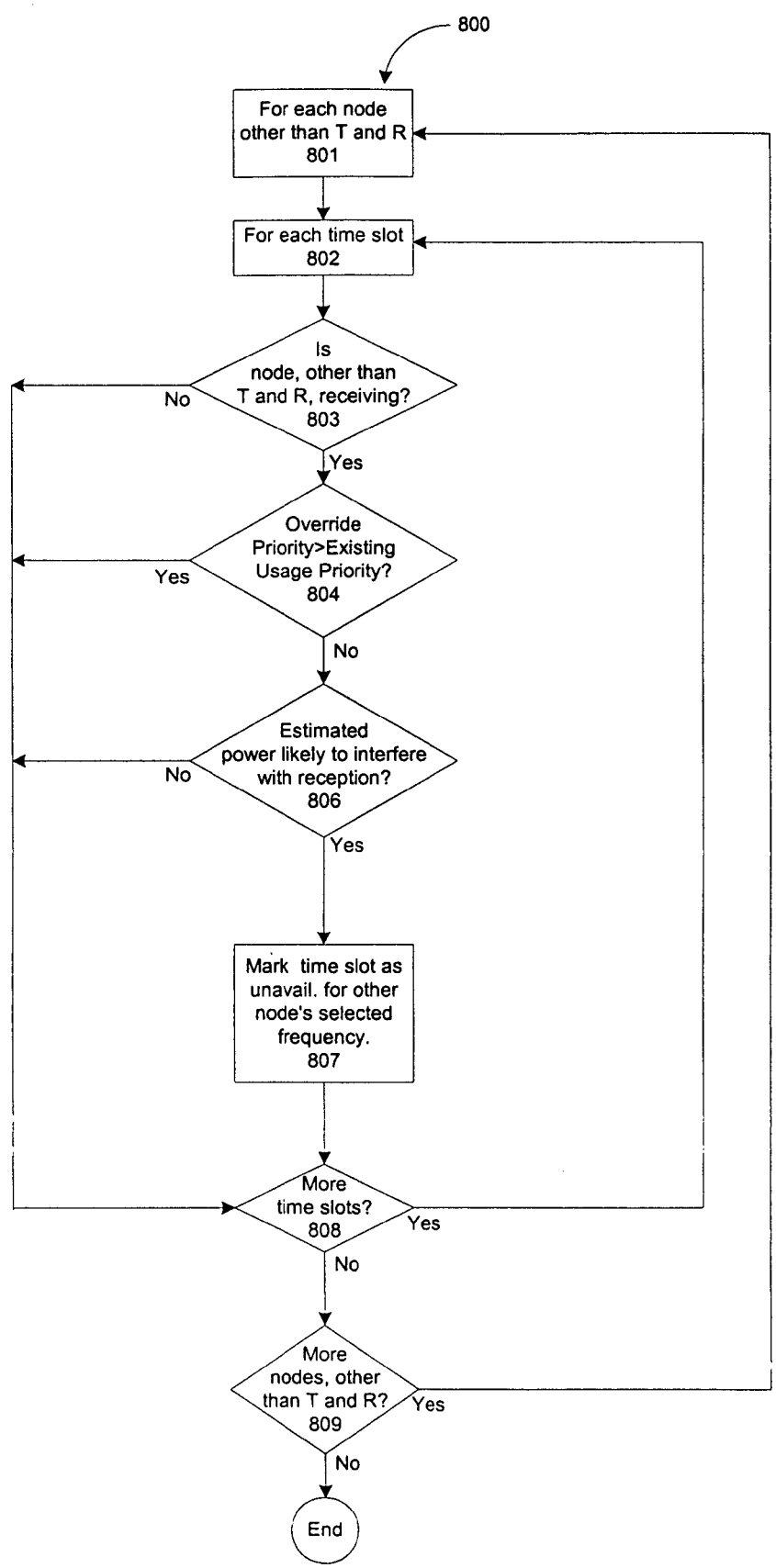
FIG. 8 is a flow diagram of an exemplary transmitting node intranetwork interference program in accordance with an aspect of the present invention.

In FIG. 8, there is shown a flow diagram of an exemplary transmitting node intranetwork interference program 800 in accordance with an aspect of the present invention. Step 605 of FIG. 6A may be replaced by steps 801 through 809.

With continuing reference to FIG. 8 and renewed reference to FIG. 6A, at step 801, a node, other than T or R, is selected. Such a node is termed "other node" to indicate it is a node other than T or R, or T or Rs in a multicasting embodiment. Such "other node" is within an interference area of T or R, or T or Rs in a multicasting embodiment. At step 802, a time slot is selected. At step 803, a determination is made as to whether such other node selected at step 801 is receiving during such time slot selected at step 802. If such other node is not receiving, then a check for another time slot is made at step 808. In other words, the array of step 602 will be unaltered with respect to such other node and such a time slot.

If, at step 803, such other node is pre-allocated to receive during such a time slot selected at step 802, then at step 804 a determination is made as to whether override priority is greater than such other node's usage priority. If override priority is greater, then a check for another time slot is made at step 808. In other words, the array of step 602 will be unaltered with respect to such other node and such a time slot.

If, however, at step 804 such other node's usage priority is equal to or greater than override priority, then at step 806 it is determined whether power from T's transmission, or more particularly an estimated received power at such other node resulting from T's transmission, is likely to interfere with such other node's reception. Received power may be estimated by knowledge of transmit and receive antenna patterns using an RF propagation model such as Longley-Rice or Unified Ultra-High Frequency (Unified UHF), and likely to interfere may be determined by comparison of an expected received power at such other node caused by (i) transmission from T and (ii) transmission to such other node from an intended transmitter. Conventionally, when a ratio of intended power divided by interference power is less than a signal-to-interference ratio (SIR) threshold, where SIR threshold is modulation dependent, interference is likely. Conventional values are approximately 20 decibels. If interference is unlikely, then another time slot is selected at step 802. If interference is likely, then at step 807 such time slot and such other node's selected frequency is marked as unavailable by incrementing that location in the array of step 602. Notably, there is a difference between self-conflicts and intranetwork conflicts with respect to marking frequencies as unavailable.

At step 808, a determination is made as to whether there are more time slots to check for such other node. If there is at least one other time slot to check, then another time slot is selected at step 802.

If there is no other time slot to check for such other node, then at step 809 a determination is made as to whether at least one other node is to be processed. If at least one other node is to be processed, then such other node is selected at step 801. If no other node is to be processed, then program 800 ends.

Figure 9:
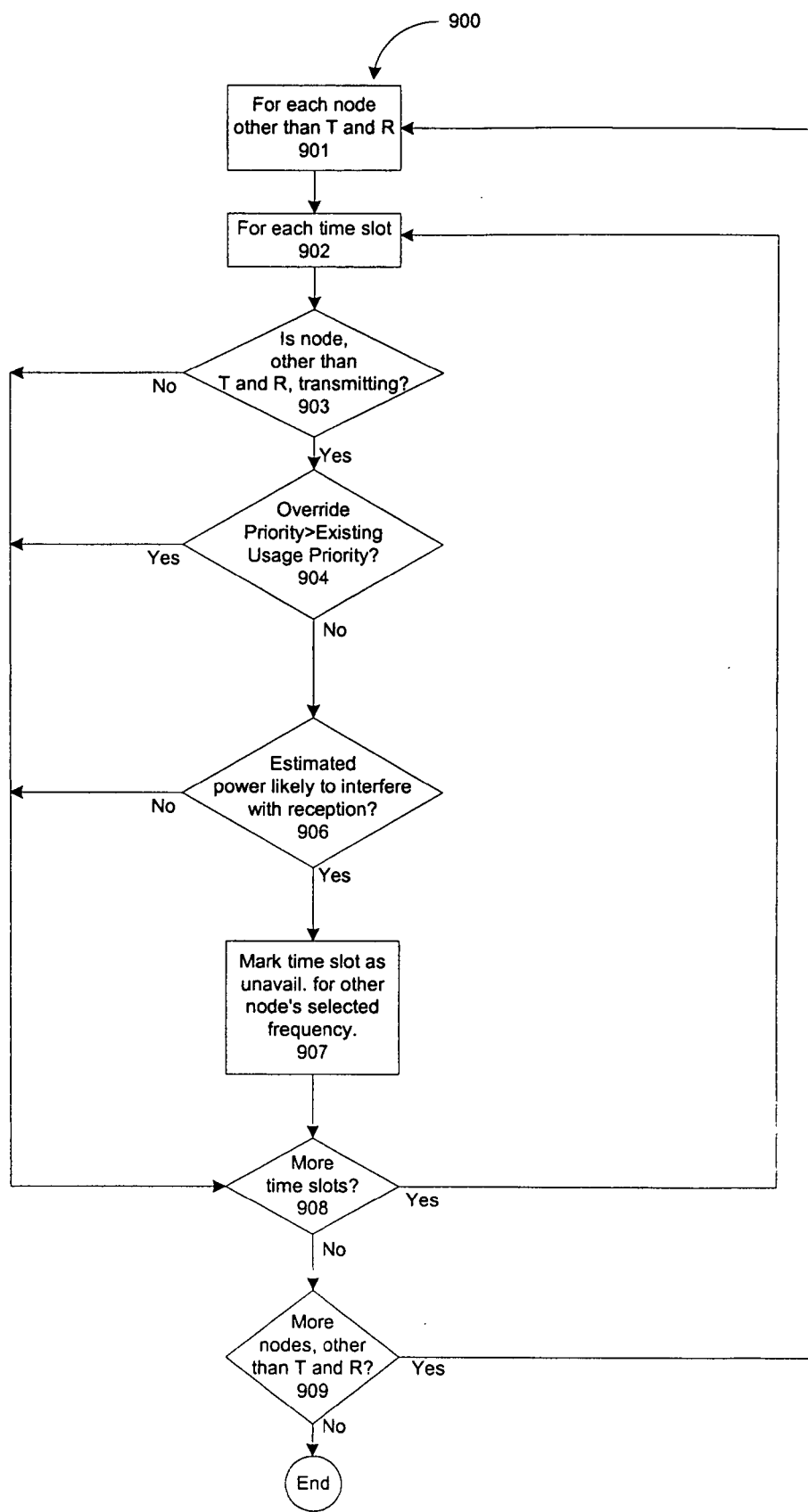
FIG. 9 is a flow diagram of an exemplary receiving node intranetwork interference program in accordance with an aspect of the present invention.

In FIG. 9, there is shown a flow diagram of an exemplary receiving node intranetwork interference program 900 in accordance with an aspect of the present invention. Step 606 of FIG. 6A may be replaced by steps 901 through 909.

With continuing reference to FIG. 9 and renewed reference to FIG. 6A, at step 901, a node, other than T or R, or T or Rs in a multicasting embodiment, is selected. Such other node is within an interference area of T or R, or T or Rs in a multicasting embodiment. For purposes of clarity, hereinafter R is used to mean R, as in point-to-point communication, and Rs, as in point-to-multipoint communication. At step 902, a time slot is selected. At step 903, a determination is made as to whether such other node selected at step 901 is pre-allocated to transmit during such time slot selected at step 902. If such other node is not transmitting, then another time slot is selected at step 902. In other words, the array of step 602 will be unaltered with respect to such other node and such a time slot.

If at step 903, such other node is pre-allocated to transmit during such a time slot selected at step 902, then at step 904 a determination is made as to whether override priority is greater than planned usage priority. If override priority is greater than planned usage priority, then a check for another time slot is made at step 908. In other words, the array of step 602 will be unaltered with respect to such other node and such a time slot.

If, however, at step 904 such other node's planned usage priority is equal to or greater than override priority, then at step 906 it is determined whether power from such other node's transmission, or more particularly an estimated received power from such other node's transmission, is likely to interfere with R's reception. If interference is unlikely, then a check for another time slot is made at step 908. If interference is likely as described above, then at step 907 such time slot and such other node's selected frequency is marked as unavailable by incrementing that location in the array of step 602.

At step 908, a determination is made as to whether there is another time slot to check for such other node. If there is at least one other time slot to check, then another time slot is selected at step 902. If there is no other time slot to check for such other node, then at step 909 a determination is made as to whether at least one other node is to be processed. If at least one other node is to be processed, then such other node is selected at step 901. If no other node is to be processed, then program 900 ends.

External Interference

With renewed reference to FIG. 6A, at step 607 a determination of conflict by external interference is made. Nodes 300 (shown in FIG. 3) build a database comprising such external interference as detected in the course of operation, as described in more detail below. This database comprising discovered external interference is checked and if it appears likely that one will transmit during a time slot, at a frequency, and with sufficient power to interfere with a scheduled transmission from T to R, then such a time slot and frequency are marked as unavailable in the array.

Slot Allocation and Assertion

Figure 10:
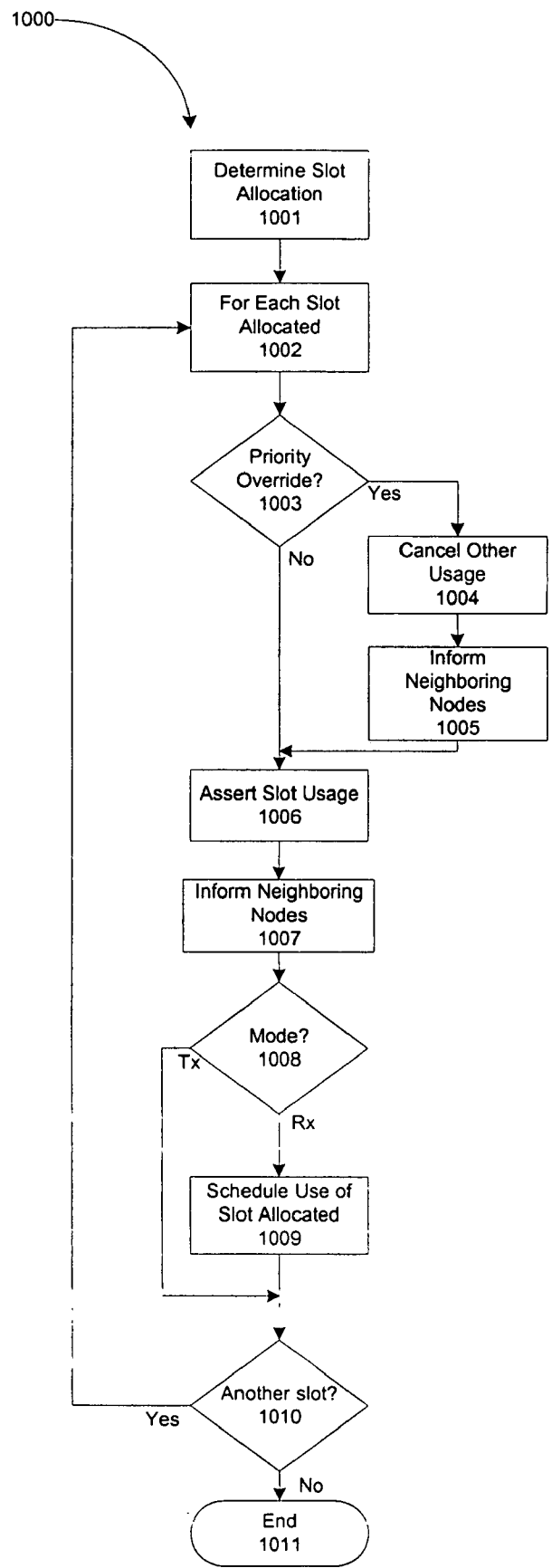
FIG. 10 is a flow diagram of an exemplary slot allocation and assertion program in accordance with an aspect of the present invention.

After completion of program 600 shown in FIG. 6A with respect to identification of self-conflicts, intranetwork interference, and external interference, allocated communication slots are to be asserted. Referring to FIG. 10, there is shown a flow diagram of an exemplary slot allocation and assertion program 1000 in accordance with an aspect of the present invention.

With continuing reference to FIG. 10 and renewed reference to FIGS. 5B and 6A, at step 1001, slot allocation is determined by accessing an array as processed by program 600. Available slots, as indicated in the array of step 602 as amended, are pseudo-randomly selected in a number sufficient to fulfill or partially fulfill that amount of communication slots identified at step 519 of program 510. Thus, at step 519, program 1000 may be called by program 510 for such allocation. With respect to time slot allocation, it should be understood that a time slot may have one or more frequencies associated with it. Thus, while one or more frequencies associated with a time slot are unavailable, one or more other frequencies associated with such a time slot may be available, except that if a slot is chosen at a specific time and frequency, no other slot may be selected at that same time even if another frequency is also available.

At step 1002, a slot allocated at step 1001 is accessed. At step 1003, it is determined whether such an allocated slot was made available by priority override. For each such slot made available by priority override, at step 1004, an asserting node cancels another's slot allocation and then may assert its own slot allocation. All neighboring nodes, whether one or more neighbors, of such a node canceling such usage are informed of this cancellation at step 1005 using communication between nodes.

If no priority override leading to cancellation of this slot allocation occurred at step 1004, then such a node asserts its allocation without such cancellation at step 1006.

At step 1006, slot usage is asserted for such a communication slot for such a future use. At step 1007, all neighboring nodes, whether one or more neighbors, of such a node making such slot allocation are informed of assertion of such a communication slot usage by communication between nodes. By assertion, it is meant that an actual allocation is made in a database shared among nodes.

At step 1008, usage of an asserted slot allocation is determined, namely to transmit or receive. If an asserted slot allocation is to have an asserting node receive data, then that allocation is scheduled at step 1009 for execution in a current or one or more subsequent frames. If an asserted slot allocation is to have an asserting node transmit data, program 1000 looks for another slot at step 1010.

At step 1010, a check is made for another slot. If there is another slot to be allocated, then a next slot is allocated at step 1002. If there is no other slot to be allocated, then at step 1011 program 1000 ends.

Figure 11:
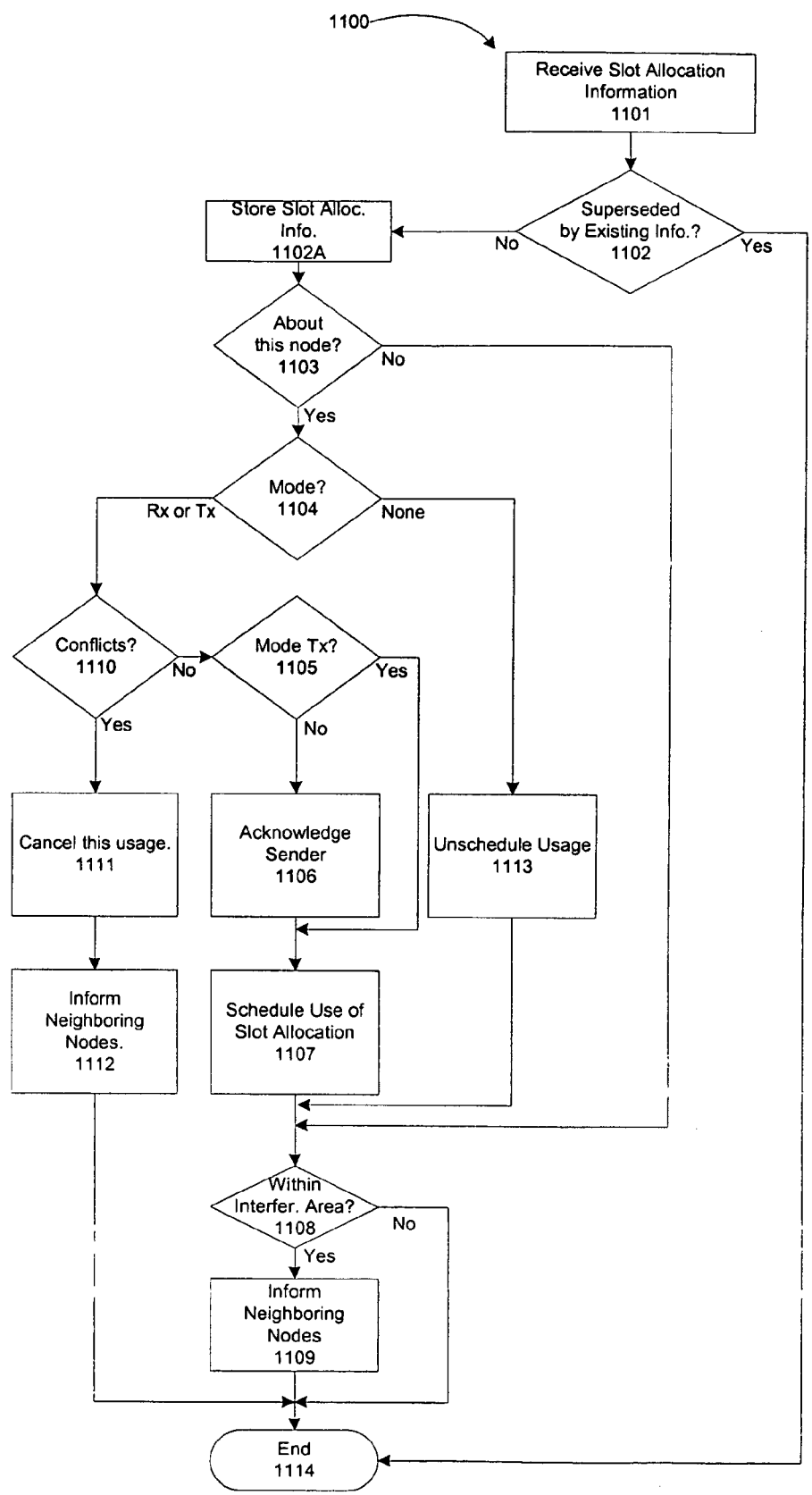
FIG. 11 is a flow diagram of an exemplary acknowledgement program in accordance with an aspect of the present invention.

Referring to FIG. 11, there is shown a flow diagram of an exemplary acknowledgement program 1100 in accordance with an aspect of the present invention. It should be understood that program 1100 may be run at a T or an R node or at a neighboring node of an asserter of a slot allocation.

At step 1101, a slot allocation transmission associated with information sent at step 1007 of FIG. 10 is received at a neighboring node of an asserting node. At step 1102, a determination is made as to whether such slot allocation transmission has been superseded by other information already received and stored at such neighboring node. Examples of reasons for supersession include a delay in transmission owing to a fault in network 100 (shown in FIG. 1), simultaneous assertion of a same slot by differing nodes 300 (shown in FIG. 3), and the like. If such slot allocation transmission has been superseded, then program 1100 terminates at step 1114.

If such slot allocation information has not been superseded, then at step 1102A slot allocation information is stored. Then at step 1103, a determination is made as to whether such slot allocation pertains to this node, namely, a node executing program 1110.

If such slot allocation does not pertain to this node, then program 1110 proceeds to step 1108. At step 1108, a node determines whether transmission associated with such slot allocation is within such node's interference area. If at step 1108 such transmission associated with such slot allocation is within such interference area, then at step 1109 such node executing program 1100 advertises to all its neighboring nodes, whether one or more neighbors of this slot allocation received at step 1101. If at step 1108 such transmission associated with such slot allocation is not within an interference area of such a node executing program 1100, then program 1100 terminates at step 1114.

If, however, at step 1103 this slot allocation pertains to such a node running program 1100, then at step 1104, a determination is made as to what mode such a slot allocation indicates. If a no mode or none condition is indicated, for example if another node has canceled or rejected a slot allocation, then this slot allocation usage is canceled at step 1113 followed by a check at step 1108 as previously described. If at step 1104 it is determined that such a node is to transmit or receive during such slot allocation, then a check for conflicts and interference is made at step 1110. Step 1110 executes program 615 (shown in FIG. 6A) to determine if this slot allocation is acceptable. If such slot allocation is acceptable, then at step 1105, a check is made as to whether mode is to transmit or receive for such a node. If the mode is receive, the message is acknowledged at step 1106. Then, for either mode, at step 1107 such slot allocation is scheduled for use followed by a check at step 1108 as previously described.

If, however, at step 1110 or 1105, it is determined that a slot allocation received at step 1101 is not acceptable, then at step 1111 such slot allocation usage is canceled, and at step 1112 such cancellation is advertised to all neighboring nodes, whether one or more neighbors, of the node running program 1100. After which, program 1100 terminates at step 1114.

Frame Execution

Figure 12:
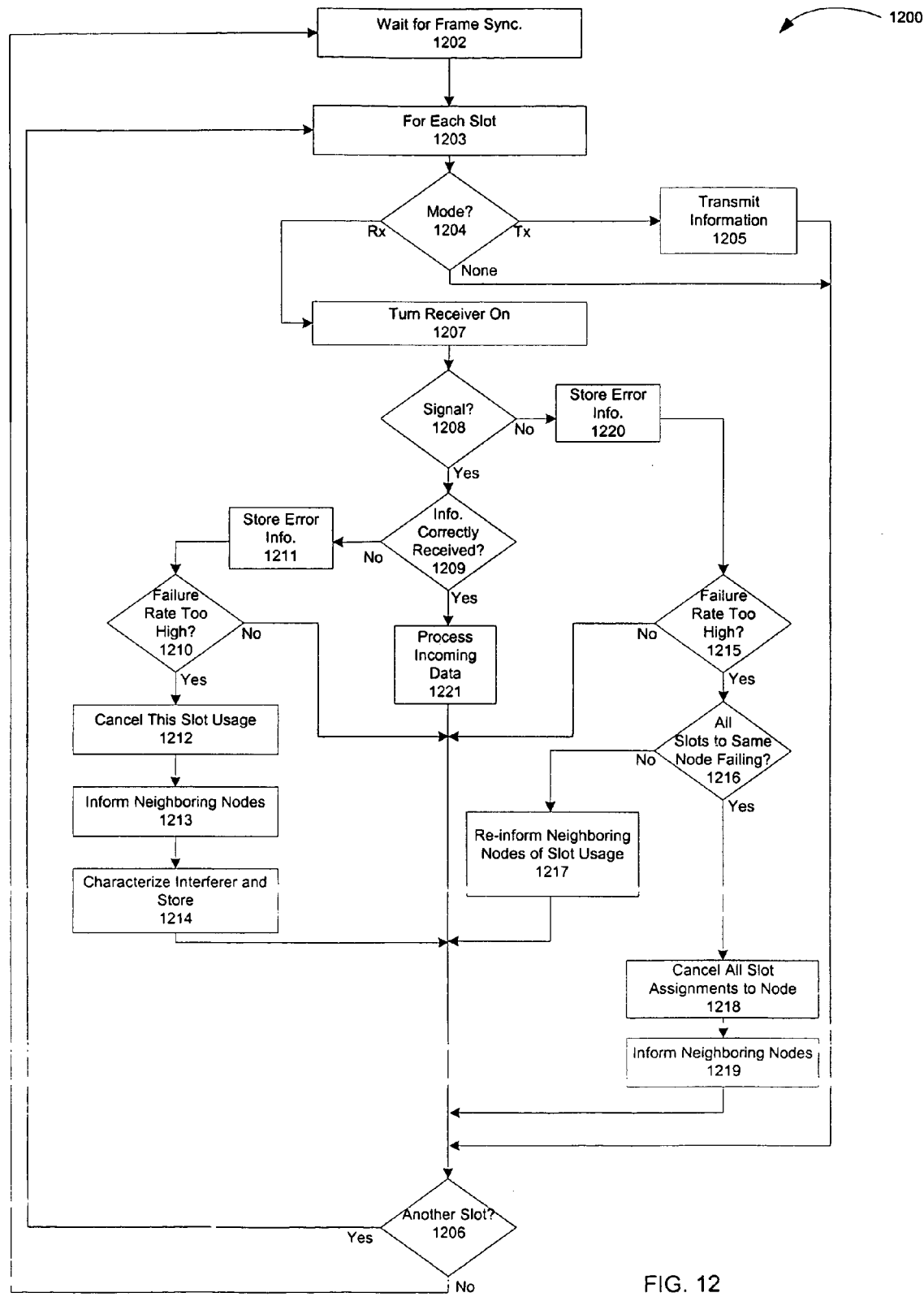
FIG. 12 is a flow diagram of an exemplary frame execution program in accordance with an aspect of the present invention.

FIG. 12 is a flow diagram of a frame execution program 1200 in accordance with an aspect of the present invention. In addition to transmitting and receiving messages, frame execution program 1200 is configured for operationally determining external interference in real-time. Program 1200 may be resident in memory 307 of a node 300 (shown in FIG. 3) and runs continuously, stepping through each time slot in a frame, or if all slots have been processed, then going through each slot in a next frame, and so on.

At step 1202, program 1200 waits for a frame synchronization indicator. After receipt of a frame synchronization signal, at step 1203 a first communication slot is selected and used at a node executing program 1200.

At step 1204, it is determined which mode, transmit, receive, or none, is associated with such a selected slot at step 1203. If such a slot is allocated for transmitting, then at step 1205 information is transmitted, and at step 1206 a check is made for another slot in such a frame. If there is no other slot to access, then a next frame synchronization signal is awaited at step 1202. If there is another slot at step 1206, then at step 1203 another slot is selected and used.

If such a slot is not allocated for transmitting or receiving at step 1204, then at step 1206 a check for another slot is made. If at step 1204 it is determined that a slot is allocated for receiving, then at step 1207 a transceiver or receiver of such a node running program 1200 is put in a receive mode or turned on.

At step 1208, a check is made to determine whether an incoming signal is detected with sufficient strength by such a node's transceiver or receiver. A receive signal strength indicator (RSSI) may be used for detecting a signal of sufficient strength. If signal is detected at step 1208, then at step 1209 a determination is made as to whether a message associated with such detected signal is correct. In other words, has this received information been corrupted.

Well-known forward error correction algorithms, including but not limited to Convolutional Coding, Block Coding and the like, may be used for determining whether information is corrupt. Interference is a reason information may be corrupted; however, there are many other well-known possible reasons. If such information is not corrupted, then the incoming data is processed at step 1221. Such slot remains in use, and such a node executes instructions to check for a next slot in this frame at step 1206.

If such information is corrupted, then error information is stored at step 1211. At step 1210 a check is made to determine if failure rate for repeated use of such a selected slot is too high. An acceptable failure rate may be in a range of approximately one percent (1%) to five percent (5%) of packets depending on application. If failure rate is not too high, then such slot remains in use. A check is then made for another slot at step 1206. Recorded errors may be stored in a database in memory 307 of node 300 of FIG. 3. During a later frame, this recorded error may provide an indication that an accumulated error rate for such a time slot has become too high.

If, however, such failure rate is too high, then at step 1212 usage of this slot is canceled. At step 1213, this cancellation is advertised to neighboring nodes to such a node running program 1200.

At step 1214, detected interference is characterized, such as by time, frequency, power, and probable transmitter location. Accordingly, information from step 1214 may be stored, for example in memory 307 of FIG. 3, for subsequent access for later slot allocation attempts.

If no signal is detected or a signal of insufficient strength such that no data is obtained at step 1208, then at step 1220 such error information is stored. At step 1215 a check is made to determine if failure rate, as described above, for such a node is too high, as described above. By way of example and not limitation, signal may not be detected if a transmitter of a transmitting node is not working or not working properly. If such a node's receiver is not working properly or if the slot allocation assertion messages previously described were not exchanged properly. If failure rate is not too high, then such communication slot remains in use. At step 1206 a check for another communication slot within a frame is made.

If, however, failure rate is too high, then at step 1216 a check is made to determine whether a plurality of receive slots from the same transmitter are failing. This indicates whether a transmitting node is unaware of such a specific slot allocation, or is malfunctioning, or is being blocked, such as by an obstruction between transmitting and receiving nodes. If not all receive slots are failing, then at step 1217 neighboring nodes to such a node are re-informed of planned slot usage for such a communication slot. Accordingly, such a communication slot remains in use and a check for another communication slot is made at step 1206.

If, however, at step 1216 approximately all communication slots are failing, then at step 1218 all communication slot assignments to this receiving node from an associated sending node are canceled.

At step 1219, nodes neighboring such a receiving node, are informed of such a cancellation of all communication slot assignments associated with such a sending node, and a check for a next slot is made at step 1206.

Network Join

Figure 13:
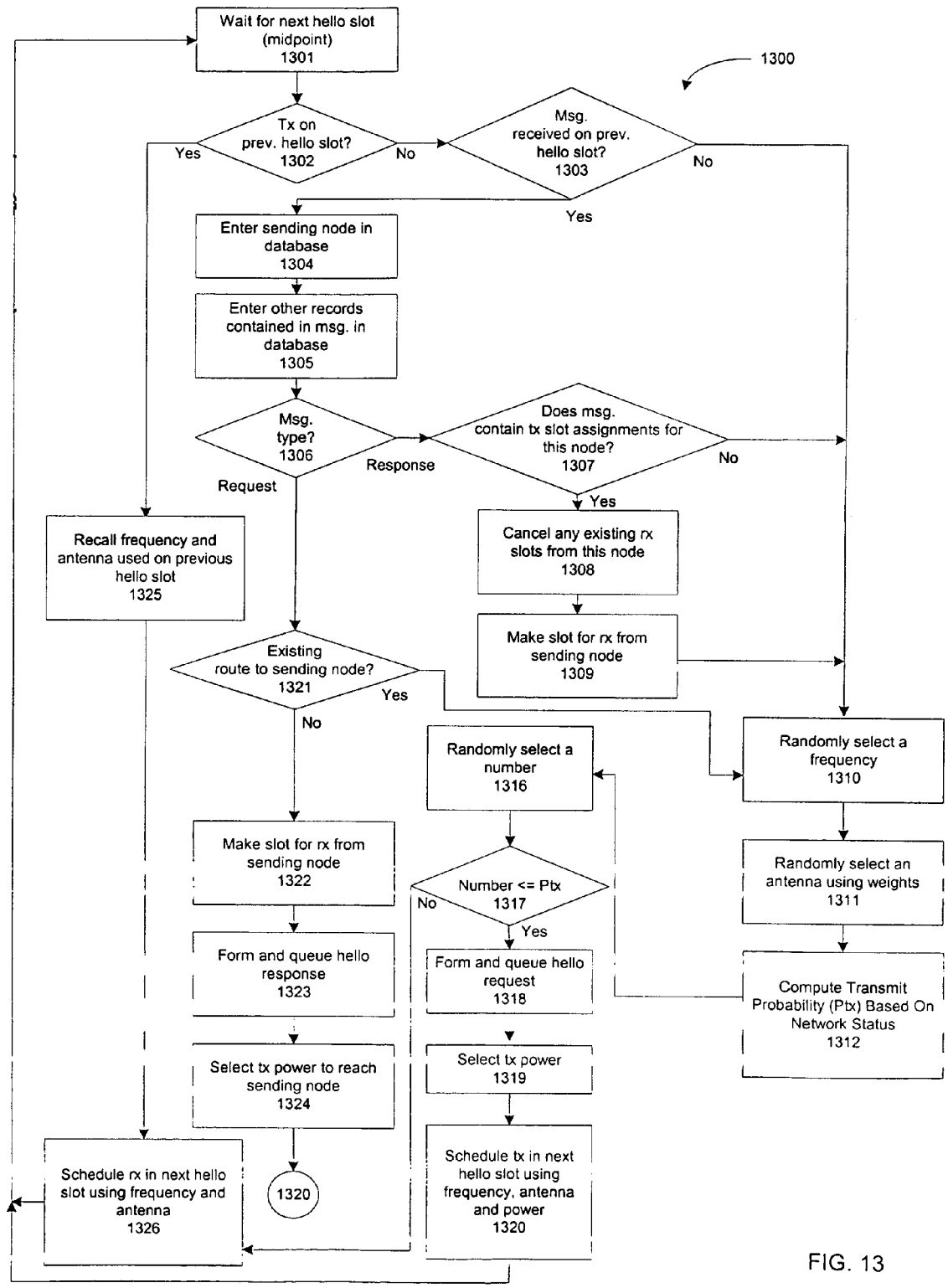
FIG. 13 is a flow diagram of an exemplary network join protocol in accordance with an aspect of the present invention.

Referring to FIG. 13, there is shown a flow diagram of an exemplary network join protocol 1300 in accordance with an aspect of the present invention. Program or protocol 1300 is used for an isolated node 101 or 102 to join network 100 or for two networks to join. By isolated node, it is meant a node 101 or 102 not yet having joined network 100 or a node 101 or 102 having lost contact with network 100. For example, a new node communicates its presence and waits to be contacted by a node on network 100 of FIG. 3 or vice versa. With this contact, such a new node may receive current operating parameters. The overreaching concept is to achieve at least one link to another node and then use that link to obtain data from a shared database. This data provides in part communication information for nodes within a neighborhood. Once such data is obtained, network connectivity may be enhanced.

One or more communication slots designated for use by a network join protocol are known as "hello" slots. Unlike other communication slots, use of "hello" communication slots is not allocated and asserted prior to usage, but rather is contention based. Allocation of additional slots speeds operation of such a network join protocol. However, one "hello" slot per frame is sufficient.

At step 1301, program 1300 waits for a next "hello" slot, more particularly, a midpoint between two next "hello" slots. When such a next "hello" slot is available, at step 1302, it is determined whether transmit, or receive, occurred on a previous "hello" slot.

If transmit occurred on a previous "hello" slot, antenna and frequency used for such a previous "hello" slot transmission are obtained at step 1325. At step 1326, a receive is scheduled in a next network join or "hello" communication slot using frequency and antenna obtained at step 1325. Then, at step 1301, program 1300 waits for another "hello" slot.

If, at step 1302, it is determined that a previous "hello" operation was a receive function, then at step 1303 it is determined whether a message was received on such a previous frame. If no message was received on such a previous frame, then at step 1310 a frequency is randomly selected. At step 1311, an antenna is randomly selected using weights. By weights, it is meant using knowledge from prior experience. For example, a weighting for each antenna or sector, $W_s$, may be set equal to, $$W_s = (1 + \text{number of known nodes within a sector})/(\Sigma_i W_{s_i}). \quad (4)$$

At step 1312, a transmit probability is computed as a function of such a node's network status. Such a transmit function should provide a high probability of transmission (approximately 0.9) for an isolated node, a medium probability of transmission (approximately 0.5) for a node with a few links to other nodes, and a low probability (approximately 0.1) for a node with many links to other nodes and in particular for a node with backhaul connectivity.

At step 1316, a number is randomly selected from 0.0 to 1.0. At step 1317, it is determined whether the number selected in step 1316 is greater than probability set at step 1312. If such a number from step 1317 is greater than such a probability from step 1312, then at step 1326 a receive operation is scheduled as described above. If such a number from step 1317 is less than or equal to such a probability, then at step 1318 a message called a "hello" request is formed and queued. Form of such a "hello" request comprises a header including message type, node identification and time. Such "hello" messages may also comprise a number of records from a shared database, for example, node location record and node status record. This additional information is used to update or populate a local database of such a node running program 1300.

At step 1319, transmit power is selected as a function of nodes in a selected antenna sector of step 1311 and time since a last link with any node in that sector. A goal is to use a minimum transmit power needed to reach another node. If however a search has been conducted for some time without success, than transmit power is increased to expand the scope or range of transmission of a "hello" request.

At step 1320, a transmit operation is scheduled for a next "hello" slot using frequency from step 1310, antenna from step 1311 and power from step 1319. Then, at step 1301, program 1300 waits for another next "hello" slot.

If at step 1303 a message was received on a previous "hello" slot, then at step 1304 a node sending such a message is entered into a database, namely, a shared database of other nodes as mentioned above. At step 1305, other records contained in such a message may be entered into the above-mentioned database.

At step 1306, it is determined whether a message from step 1303 is a "hello" response or a "hello" request. If at step 1306 it is determined that such a message type is a request, namely not a response, then at step 1321 it is determined whether there is an existing route to such a node sending such a request. If there is a known or existing route, program 1300 proceeds at step 1310 as previously described. If there is no existing route, then at step 1322 a communication slot is made for this node running program 1300 to receive data from a responding node. Making this slot involves checking for conflicts and interference as previously described. At step 1323 a "hello" response is formed and queued. Form of a "hello" response at step 1323 comprises node location, node status, current frame plan and slot assignment records.

At step 1324, transmit power is selected, as previously described, to reach such a node sending such a request. Then, program 1300 proceeds at step 1320 as previously described.

If at step 1306 it is determined that such a message is a "hello" response, then at step 1307 it is determined whether such a message contains at least one communication slot assignment for this node 101 or 102 running program 1300. A "hello" response is provided in reply to a "hello" request, and thus a "hello" response states where it is and how to communicate with it. If there is no communication slot assignment, then program 1300 proceeds to step 1310 described above.

If there is at least one communication slot assignment, then program 1300 proceeds to step 1308 to cancel any and all existing receive slots from this sending node. This action is taken because the other node responds only if it does not have knowledge of any route between the two nodes. At step 1309, a receive slot is made for this node running program 1300 to receive data from such a responding node. Making this slot involves checking for conflicts and interference as previously described. Then, program 1300 proceeds at step 1310 as previously described.

Actual sending of scheduled messages with respect to steps 1320 and 1326 is done within a frame execution program, as described above. Notably, though a response is described above as providing information for communication to such a responding node, such a response may comprise information for communication in both directions, namely to and from a requesting node.

Although the network join protocol as described allows a new node to join an existing network without the provision of any configuration information, providing such information can significantly speed such network join protocol. Additional configuration information may be provided in many ways, including: providing a new node with a list of one or more existing nodes and their locations, or providing existing nodes with the probable location of a new node. Such information can be provided to nodes either manually, downloaded over a communication link, loaded through a media interface, or gleaned by passively monitoring a radio channel of interest for sources of energy.

Accordingly, it should be understood that a node selects how to allocate channels for network traffic, in part determining bandwidth availability and dynamically allocating bandwidth for transmission of such traffic. Nodes may communicate with one another by point-to-point, broadcast, or multicast communication, though some nodes are neither an originating node or an ultimate destination node for a message. Such a mesh protocol in accordance with an aspect of the present invention facilitates extended communication range and continued service by distributed channel management for dynamically allocating around conflicts and interference.

Each node's configuration within a network is determined at least in part by neighboring nodes in such a network. Thus, it should be appreciated that a mesh protocol in accordance with an aspect of the present invention reduces costs associated with deployment by reducing the amount of infrastructure required. Additionally, use of neighboring nodes as infrastructure reduces the requirement for extended communication range, simplifying customer installation complexity. Neighboring nodes do not serve as such infrastructure in other wireless architectures. Moreover, each node may make channel allocation decisions facilitating scaling of such a network.

Furthermore, a network in accordance with an aspect of the present invention provides users significant bandwidth. By way of example, if each node is capable of communicating at approximately 36 megabits per second (Mbps) and for every 100 nodes in a mesh, and if each time slot can be reused by eight transmitter/receiver pairs, then such a network is capable of transporting 288 (36 Mbps*8) Mbps. Thus, for example, if each packet is forwarded through two intermediate nodes in such a network, each packet is transported three times, namely, three hops, so that 96 Mbps of non-duplicated information may be transported at any instant in time in such a mesh. If one-half of such nodes are being used by customers and are actively transmitting or receiving customer traffic, not intermediated nodes, each customer is capable of achieving an average of 1.92 (96 Mbps/50) Mbps of bandwidth using a single frequency channel. Notably, this may be asymmetric or symmetric communication.

An aspect of the present invention is a mesh architecture, or more particularly a synchronous mesh architecture, that may comprise only point-to-point links, only point-to-multipoint links, only broadcast links, or any combination thereof. Currently, in the United States of America transmit power on UNII band broadcast or point to multipoint links is limited by the Federal Communications Commission (FCC) to four watts Effective Isotropic Radiated Power (4 W EIRP) while point-to-point links are limited to two hundred watts EIRP (200 W EIRP). Thus, a network formed of only point-to-point links may benefit from a decisive range and link closure advantage.

Aspects of the present invention comprise programs, which may be implemented as a program product for use with a node 300, for example, by programming memory 307 of FIG. 3. Alternatively, such programs may be provided to a computer. The program(s) of the program product defines functions of the embodiments and can be contained on a variety of signal/bearing media, which include, but are not limited to: (i) information permanently stored on "non-writable" storage media (e.g., read-only memory devices within a computer such as CD-ROM disks readable by a CD-ROM drive); (ii) alterable information stored on "writable" storage media (e.g., floppy disks within a diskette drive or hard-disk drive); (iii) information stored on integrated circuit memory; or (iv) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

Although various embodiments which incorporate the teachings of the present invention have been shown and described in detail herein, those skilled in the art can readily devise many other varied embodiments that still incorporate these teachings.

All trademarks are the property of their respective owners.

What is claimed is:

1. A method for determining communication slot allocation, comprising:
    providing a network of nodes;
    determining whether there is at least one conflict for a planned transmission at a first node;
    amending the network in response to the at least one conflict identified at the first node;
    determining whether there is at least one conflict for the planned transmission at a second node;
    amending the network in response to the at least one conflict identified at the second node;
    identifying first potential interference between the first node and a first other node within an interference area of the first node for the planned transmission;
    amending the network in response to the potential interference identified;
    identifying second potential interference between the second node and a second other node within an interference area of the second node for the planned transmission;
    amending the network in response to the second potential interference identified;
    identifying third potential interference which would mitigate against selecting at least one communication slot for allocation thereof for the planned transmission;
    amending the network in response to the third potential interference identified; and
    selecting the at least one communication slot using the network as amended for allocation of the at least one communication slot for the planned transmission.

2. The method of claim 1 wherein the network is frequencies by times.

3. The method of claim 1 wherein the first node is a transmitting node and the second node is a receiving node, the at least one conflict is a self-conflict, the first potential interference is intranetwork interference associated with the transmitting node, the second potential interference is intranetwork interference associated with the receiving node, and the third potential interference is external interference.

4. The method of claim 1 wherein the network is frequencies by times, and wherein the at least one conflict is a self-conflict, the first potential interference and the second potential interference are intranetwork interference, and the third potential interference is external interference.

5. A computer readable medium containing a program which, when executed by a processor in response to receiving a request to determine available communication slots, causes execution of a method comprising:
    determining whether there is at least one conflict for a planned transmission between a first node and a second node;
    amending a network of nodes in response to the at least one conflict identified;
    identifying first potential interference between the first node and a first other node within an interference area of the first node for the planned transmission;
    amending the network in response to the potential interference identified;
    identifying second potential interference between the second node and a second other node within an interference area of the second node for the planned transmission;
    amending the network in response to the second potential interference identified;
    identifying third potential interference which would mitigate against selecting at least one communication slot for allocation thereof for the planned transmission;
    amending the network in response to the third potential interference identified; and
    selecting the at least one communication slot using the network as amended for allocation of the at least one communication slot for the planned transmission.

6. The method of claim 5 wherein the network is frequencies by times.

7. The method of claim 6 wherein the at least one conflict is a self-conflict, the first potential interference and the second potential interference are intranetwork interference, and the third potential interference is external interference.

8. A method for determining intranetwork conflicts for a planned transmission from a transmitting node to a receiving node, comprising:
    providing a network of nodes;
    obtaining a first node not the transmitting node or the receiving node;
    obtaining a communication slot;
    determining whether the first node is pre-allocated to receive a transmission during the communication slot;
    if the first node is pre-allocated to receive the transmission during the communication slot, checking the pre-allocated priority of the first node against priority of the planned transmission; and
    if the priority of the planned transmission is not greater than the pre-allocated priority of the first node, determining whether a power level for the planned transmission is of sufficient strength to interfere with reception during the communication slot of the first node.

9. The method of claim 8 further comprising if the power level is of sufficient strength to cause interference with the reception of the first node, amending the network to indicate that a frequency associated with the communication slot is unavailable.

10. The method of claim 9 further comprising obtaining another communication slot.

11. The method of claim 10 further comprising checking for a second node, not the transmitting node or the receiving node, to process for determining the intranetwork conflicts for the planned transmission from the transmitting node to the receiving node.

12. A computer readable medium containing a program which, when executed by a processor in response to receiving a call to determine available communication slots, causes execution of a method comprising:
    providing a network of nodes;
    obtaining a neighbor node of the transmitting node or the receiving node;

obtaining a communication slot;
determining whether the neighbor node is pre-allocated to receive a transmission during the communication slot; and
if the neighbor node is pre-allocated to receive the transmission during the communication slot, checking the pre-allocated priority of the neighbor node against priority of the planned transmission; and
if the priority of the planned transmission is not greater than the pre-allocated priority of the neighbor node, determining whether a power level for the planned transmission is of sufficient strength to interfere with reception during the communication slot of the neighbor node.

13. A method for determining intranetwork conflicts for a planned transmission from a transmitting node to a receiving node, comprising:
providing a network of nodes;
obtaining a first node not the transmitting node or the receiving node;
obtaining a communication slot;
determining whether the first node is pre-allocated to transmit a transmission during the communication slot;
if the first node is pre-allocated to transmit the transmission during the communication slot, comparing priorities of the pre-allocated transmission and the planned transmission; and
if the priority of the planned transmission is not greater than the pre-allocated transmission priority, determining whether a power level for the pre-allocated transmission by the first node is at least likely to interfere with reception by the receiving node of the planned transmission.

14. The method of claim 13 further comprising if the power level is sufficient to at least likely cause interference with the reception of the receiving node, amending the network to indicate that a frequency for the communication slot is unavailable.

15. The method of claim 14 further comprising obtaining another communication slot.

16. The method of claim 15 further comprising replacing the first node with a second node.

17. A computer readable medium containing a program which, when executed by a processor in response to receiving a call to determine available communication slots, causes execution of a method comprising:
providing a network of nodes;
obtaining a neighbor node not the transmitting node or the receiving node;
obtaining a communication slot;
determining whether the neighbor node is pre-allocated to transmit a transmission during the communication slot;
if the neighbor node is pre-allocated to transmit the transmission during the communication slot, comparing priorities of the pre-allocated transmission and the planned transmission;
if the priority of the planned transmission is not greater than the pre-allocated transmission priority, determining whether a power level for the pre-allocated transmission by the neighbor node is at least likely to interfere with reception by the receiving node of the planned transmission.

18. A method for determining channel access at a node to avoid conflicts and interference for communicating from the node to another node in a network of nodes, comprising:
providing the node with a collection of information;
estimating an expected load on the node;
computing an estimated slot allocation for the node in response to the expected load on the node;
adjusting slot allocation by increasing the slot allocation when the estimated slot allocation is greater than the slot allocation and decreasing the slot allocation when the estimated slot allocation is less than the slot allocation;
identifying a slot that is not likely to cause interference; and
asserting allocation of the slot including advertising the slot allocation to neighboring nodes of the node.

19. The method of claim 18 wherein the node to the another node communication is only by point-to-point communication.

20. The method of claim 18 wherein the node to the another node communication is only by point-to-multipoint communication.

21. The method of claim 18 wherein the node to the another node communication is only by broadcast communication.

22. The method of claim 18 wherein the node to the another node communication is by one or more of point-to-point communication, point-to-multipoint communication and broadcast communication.

23. A method for allowing shared channel access among nodes for communicating from a node to another node in a wireless mesh network, comprising:
providing nodes in the wireless mesh network;
communicating between the nodes using only point-to-point communication;
maintaining an expected slot allocation in response to an expected load; and
modifying, adaptively, the shared channel access by increasing a slot allocation when the expected slot allocation is greater than the slot allocation and decreasing the slot allocation when the expected slot allocation is less than the slot allocation.

24. The method of claim 23 further comprising identifying potential interference between the nodes of the wireless mesh network.

25. The method of claim 24 further comprising avoiding the interference identified.

* * * * *

UNITED STATES PATENT AND TRADEMARK OFFICE
CERTIFICATE OF CORRECTION

PATENT NO. : 7,283,494 B2  Page 1 of 1
APPLICATION NO. : 10/122659
DATED : October 16, 2007
INVENTOR(S) : Hammel et al.

It is certified that error appears in the above-identified patent and that said Letters Patent is hereby corrected as shown below:

On the Title page Item 56 – delete "Separd" and insert --Shepard--.

Signed and Sealed this

Twenty-ninth Day of April, 2008

JON W. DUDAS
*Director of the United States Patent and Trademark Office*